US011991216B1

(12) United States Patent
Venkatachari

(10) Patent No.: US 11,991,216 B1
(45) Date of Patent: May 21, 2024

(54) POLICY-BASED CLOUD ASSET AND SECURITY MANAGEMENT SYSTEM

(71) Applicant: Ariksa, Inc., Cupertino, CA (US)

(72) Inventor: Badrinath Venkatachari, Cupertino, CA (US)

(73) Assignee: Ariksa, Inc., Cupertino, CA (US)

( * ) Notice: Subject to any disclaimer, the term of this patent is extended or adjusted under 35 U.S.C. 154(b) by 0 days.

(21) Appl. No.: 18/102,499

(22) Filed: Jan. 27, 2023

Related U.S. Application Data

(63) Continuation-in-part of application No. 17/235,795, filed on Apr. 20, 2021, now abandoned.

(60) Provisional application No. 63/012,714, filed on Apr. 20, 2020.

(51) Int. Cl.
*H04L 9/40* (2022.01)

(52) U.S. Cl.
CPC .................. *H04L 63/205* (2013.01)

(58) Field of Classification Search
CPC .... H04L 41/22; H04L 41/5048; H04L 63/205
See application file for complete search history.

(56) References Cited

U.S. PATENT DOCUMENTS

| | | | | | |
|---|---|---|---|---|---|
| 8,813,174 | B1 * | 8/2014 | Koeten | ................... | H04L 67/10 713/168 |
| 2009/0077621 | A1 * | 3/2009 | Lang | ....................... | H04L 63/10 726/1 |
| 2011/0126275 | A1 * | 5/2011 | Anderson | ............... | H04L 63/14 726/8 |
| 2011/0289134 | A1 * | 11/2011 | de los Reyes | .......... | H04L 67/01 726/1 |
| 2018/0295036 | A1 * | 10/2018 | Krishnamurthy | ..... | H04L 43/026 |
| 2019/0342335 | A1 * | 11/2019 | Ni | ....................... | H04L 41/0895 |
| 2020/0059420 | A1 * | 2/2020 | Abraham | ................ | H04L 41/12 |
| 2020/0257810 | A1 * | 8/2020 | Vrabec | .................. | G06F 21/604 |

(Continued)

OTHER PUBLICATIONS

Ramgovind, Sumant, Mariki M. Eloff, and Elme Smith. "The management of security in cloud computing." 2010 Information Security for South Africa. IEEE. (Year: 2010).*

(Continued)

*Primary Examiner* — John M MacIlwinen
(74) *Attorney, Agent, or Firm* — Goodwin Procter LLP

(57) ABSTRACT

A method and system for implementing and managing security policies in a cloud environment of enterprises are disclosed. In some embodiments, the method includes creating cloud-independent policies associated with enterprise assets in the cloud environment and sharing the cloud-independent policies across one or more distributed enterprises in the cloud environment. The method also includes translating and enforcing the policies in run-time across the distributed enterprises. The method further includes applying the policies collaboratively in the distributed enterprises based on distributing policy enforcement in the distributed enterprises while centralizing policy operations, where applying the policies includes discovering cloud-based assets of the enterprises and enterprise asset data related to the cloud-based assets and creating, based on the enterprise asset data, at least one graph (organization, user, resource) representing the relationships among the assets. The enterprise asset data includes information used to detect, protect, and investigate potential problems of the assets.

17 Claims, 15 Drawing Sheets

(56) References Cited

U.S. PATENT DOCUMENTS

2021/0157671 A1* 5/2021 Shastri ................. G06F 11/301
2021/0248145 A1* 8/2021 Parker ................. G06F 16/9024

OTHER PUBLICATIONS

Basile, Cataldo, et al. "A novel approach for integrating security policy enforcement with dynamic network virtualization." Proceedings of the 2015 1st IEEE Conference on Network Softwarization (NetSoft). IEEE. (Year: 2015).

Ismail, Bukhary Ikhwan, Mohammad Fairus Khalid, and Ong Hong Hoe. "Policy management for Docker ecosystem." 2016 International Computer Science and Engineering Conference (ICSEC). IEEE. (Year: 2016).

Kretzschmar, Michael, and Mario Galling. "Security management spectrum in future multi-provider Inter-Cloud environments-Method to highlight necessary further development." 2011 5th International DMTF Academic Alliance Workshop ( SVM). IEEE (Year: 2011).

Rudolph, Manuel, Reinhard Schwarz, and Christian Jung. "Security policy specification templates for critical infrastructure services in the cloud." The 9th International Conference for Internet Technology and Secured Transactions (ICITST-2014). IEEE. (Year: 2015).

Meyer, Stefan, et al. "Quality assurance for open source software configuration management." 2013 15th International Symposium on Symbolic and Numeric Algorithms for Scientific Computing. IEEE. (Year: 2013).

Rios, Erkuden, et al. "Towards Self-Protective Multi-Cloud Applications." (Year: 2015).

\* cited by examiner

POLICY-BASED CLOUD ASSET AND SECURITY MANAGEMENT SYSTEM

CROSS-REFERENCE TO RELATED APPLICATION

The present application is a continuation-in-part of and claims the benefit of and priority to U.S. patent application Ser. No. 17/235,795, titled "Systems and Methods for Providing Policy-based Cloud Security for Enterprise Environments" and filed on Apr. 20, 2021, which claims the benefit of and priority to U.S. Provisional Application No. 63/012,714, titled "Systems and Methods for Providing Policy-based Cloud Security for Enterprise Environments" and filed on Apr. 20, 2020, each of which is hereby incorporated by reference herein in its entirety.

TECHNICAL FIELD

This disclosure relates to a method and a system for implementing and managing security policies and delivering contextual visibility and insights for a cloud environment.

BACKGROUND

Cloud computing delivers information technology services (e.g., servers, storage, networking, software, analytics, etc.) over the internet, and has become an important infrastructure to organizations or enterprises that seek innovation and collaboration. When delivering services over a cloud computing environment (e.g., public, private, or hybrid clouds), a critical issue is cloud security. Cloud security secures the cloud computing environment against both external and insider cybersecurity threats. Existing procedures and technologies for cloud security, however, face some challenges. The existing cloud security approaches are usually unable to obtain contextual visibility of the cloud computing environment. These approaches also cannot automatically discover, assess, or prioritize security risks. When enforcing security policies to adapt to organization needs such as increasing usage of cloud services, the existing cloud security approaches are complex, error-prone, and slow to keep up with the agile organization needs. Moreover, when assets (e.g., platforms, cloud services) and/or identities (e.g., users, machines) are disparate in various cloud computing environments, the existing cloud security approaches cannot scale elastically, for example, efficiently allocating computing power, bandwidth, etc.

SUMMARY

To address the aforementioned shortcomings, a method and a system for managing security policies in a cloud environment of enterprises in a de-centralized manner is provided. In some embodiments, the method creates cloud-independent policies associated with enterprise assets in the cloud environment of enterprises; shares the cloud-independent policies across one or more distributed enterprises in the cloud environment of enterprises; translates and enforces the cloud-independent policies in run-time across the one or more enterprises; and applies the cloud-independent policies collaboratively in the distributed enterprises based on distributing policy enforcement in the one or more enterprises while centralizing policy operations.

In other embodiments, a method and a system for implementing policy-based security policies is provided. In some embodiments, the method obtains enterprise asset data related to a plurality of cloud-based assets of the enterprise, wherein the cloud-based assets exist within one or more clouds. The method obtains enterprise activity data related to first cloud-based activity involving one or more of the plurality of cloud-based assets of the enterprise, wherein the first cloud-based activity occurs within the one or more clouds. The method creates, based on the enterprise asset data and the enterprise activity data, at least one graph representing a plurality of relationships among at least a subset of the plurality of cloud-based assets. The method also generates a plurality of insights based on the at least one graph. wherein the plurality of insights includes a set of actionable insights and a set of contextual insights. The method then customizes a cloud-independent security policy of the enterprise based on at least one of the actionable insights. The method further applies the customized cloud-independent security policy of the enterprise to the plurality of cloud-based assets existing within the one or more clouds and to second cloud-based activity involving one or more of the plurality of cloud-based assets within the one or more clouds.

In yet other embodiments, a method and a system for implementing security policies and delivering contextual visibility and insights for a cloud environment of an enterprise are provided. In some embodiments, the method obtains enterprise asset data related to a plurality of cloud-based assets of the enterprise. The method obtains enterprise activity data related to cloud-based activity involving one or more of the plurality of cloud-based assets of the enterprise. The method also creates, based on the enterprise asset data and the enterprise activity data, at least one graph representing a plurality of relationships among at least a subset of the plurality of cloud-based assets. The method then generates a plurality of insights based on the at least one graph, wherein the plurality of insights includes a set of actionable insights and a set of contextual insights. The method further generates and displays a visualization of at least one of the contextual insights.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles, and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
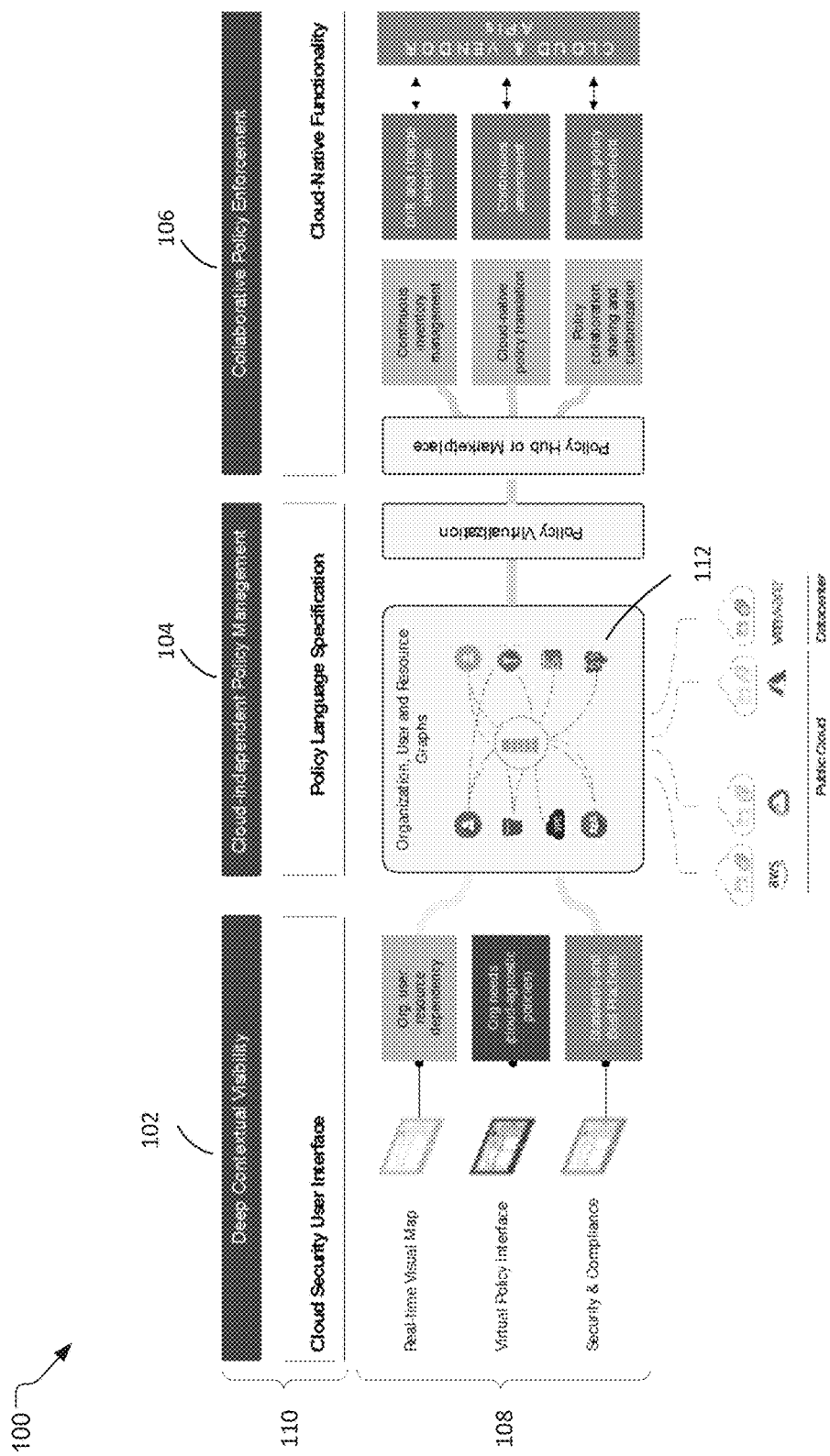
FIG. 1 illustrates an overview of an exemplary policy-based enterprise security system, according to some embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The present disclosure describes a robust mechanism that implements security policies and delivers contextual visibility for a cloud environment of an enterprise. The cloud environment may include a single cloud, hybrid cloud, or multi cloud. A single cloud may be a public cloud or a private cloud. A public cloud service is operated by a third party, while a private cloud service may be operated by a third party or an internal data center. A hybrid cloud includes both public cloud and private cloud. The policy-based management mechanism described herein is therefore applicable in various clouds operated by various cloud operators. Existing cloud security approaches, however, have limited abilities in detecting cloud-based inventory assets and imposing security policies in all kinds of cloud environments, such as in a hybrid cloud environment where workloads and data can be hosted in either a public cloud or a private cloud.

Specifically, the existing cloud security approaches cannot deliver contextual visibility into a cloud environment that includes different types of assets. For example, the relationships, dependencies, or interactions between the assets may not be identified. The existing approaches also cannot automatically discover security risks in the cloud environment and assess the impact (of the risks and potential remediation actions) on the cloud-based enterprise assets, because no multi-dimensional analysis of key factors is conducted. The analysis of key factors may identify specific presences in the cloud environment, exposure to entities outside the cloud environment, specific configurations related to all inventory assets, real-time interactions with other assets, anomalies and inconsistencies in provisioning of users and resources, etc. Moreover, the existing approaches cannot automatically prioritize the security risks, and thus cannot reduce alert fatigue caused by a high volume of alerts and false positives. As a result, operational efforts are wasted while significant risks are left unattended. In addition, the existing approaches cannot provide a scalable and agile framework for codifying and proactively enforcing organizational security needs. Therefore, organization customers are incapable of operationalizing or customizing the security rules or policies. The lack of such a policy framework also indicates a steep and continuous learning curve for large and dedicated cloud security teams (e.g., operators per cloud vendor) is needed.

The aforementioned problems may significantly impede security agility and scalable policy implementation in a single cloud environment. However, these problems would be exponentially more complex and expensive when the cloud environment includes more than one cloud and/or the security controls, services, tools, and integration in each cloud are disparate. In such a scenario, the existing cloud security approaches are essentially inapplicable.

To address the existing technical problems, the disclosure herein presents systems and methods for providing policy-based enterprise security for a cloud-based enterprise environment, where the enterprise environment includes a single cloud, a hybrid cloud, or multiple clouds. FIG. 1 illustrates an overview of an exemplary policy-based enterprise security system 100. As depicted, system 100 includes subsystems to perform the main functions as shown in 102, 104, and 106. First, system 100 gains deep visibility into enterprise assets of the cloud environment at 102. In some embodiments, the enterprise assets include inventory identities, other inventory assets, and entities. The identities may include user identities and machine identities. The user identities may be identities for groups and/or users, and the machine identities may be identities for infrastructure resources, platform resources, cloud services, etc. The other inventory assets may include roles, permissions, privileges, credentials, etc. The entities may include organizations, business units, operational environments, etc. In some embodiments, system 100 creates a deep contextual representation of a cloud environment comprising enterprise assets (e.g., user identities, machine identities, other inventory assets, and entities), and relationships, dependencies, and interactions among the enterprise assets. As compared to existing security management approaches, system 100 is technically advantageous at least in that (1) it eliminates massive blind spots due to the use of multiple tools with narrow functionality, (2) it provides a unified view to eliminate information silos in a customer cloud environment, and (3) it delivers a comprehensive and granular 360° view for each entity in the cloud environment.

In some embodiments, based on the contextual representation, system 100 automatically detects security risks in the customer cloud environment. System 100 may determine real-time, comprehensive, and granular information for each entity based on risk detection, and effectively respond to the security risks by remediating based on the determined information. As such, system 100 may eliminate unknown and unintended consequences of customer actions. By contrast, existing security management systems often provide a partial view of security risk problems, address the security risks without refined prioritization, and cause alert fatigue with too many contextless alerts, etc. Furthermore, existing systems lack the one-time remediation mechanism and the automation mechanism used to proactively perform the remediation. The existing systems therefore cannot provide robust and scalable security implementation.

System 100 generates one or more cloud security user interfaces at 102 to show the deep contextual visibility of the cloud environment. In some embodiments, these user interfaces may be various types of graphs such as organization graphs, user graphs, and/or resource graphs described below. FIG. 1 shows both a customer view 108 and a backend view 110. Customer view 108 includes user interfaces presented to a customer such as example graphs 112. Backend view 110 is responsible for fulfilling the customer views.

System 100 may conduct security policy management on the enterprise assets of the cloud environment as represented in the user interfaces. As depicted in FIG. 1, the security policy management includes two procedures 104 and 106. At 104, system 100 may perform cloud-independent policy management based on the abstract information reflected in the unified view of the user interfaces. At 106, system 100 may translate the cloud-independent policies to cloud-native policies and collaboratively enforce the translated policies on a specific cloud.

In some embodiments, through the implementation at 104 and 106, system 100 provides a convenient way to codify the security and compliance needs of an enterprise (e.g., customer) while seamlessly accommodating the viable customer need for productivity and agility. For example, system 100 may use a policy framework that includes a human-readable policy specification language to simplify but dynamically control the security policies. In this way, human interventions in policy management such as cloud-specific controls and services from customers or operational scale and agility management from cloud security experts are minimized. System 100 also automatically translates and enforces policies specified in a cloud-agnostic manner into the specific cloud-native security controls for each cloud, thereby further reducing human processes in policy management. Advantageously, system 100 not only solves the error-prone and non-scalable technical issues of the existing systems but also saves significant computing costs and reduces the risks and harm of security breach.

Management Server Components

Figure 2A:
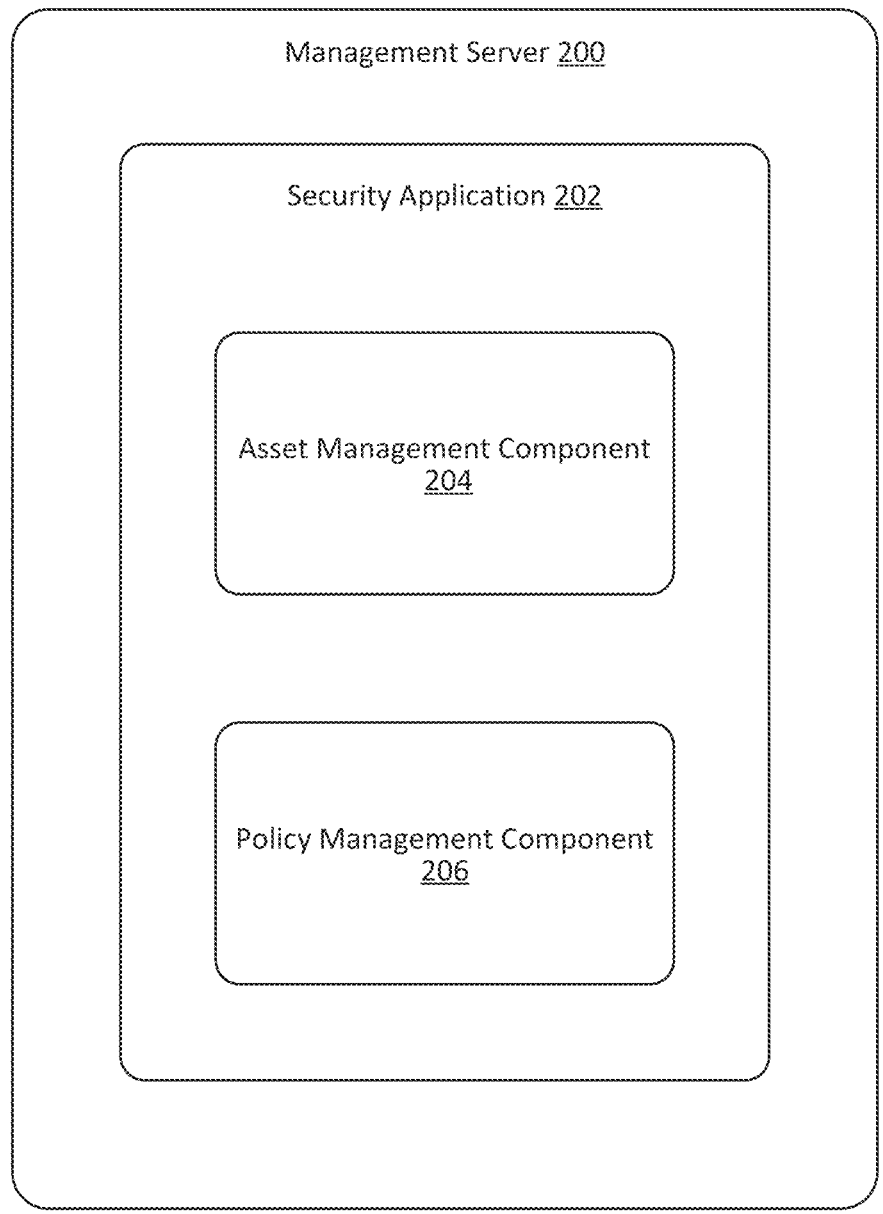
FIG. 2A illustrates selective components of a management server used to perform the policy-based enterprise security management over a cloud environment, according to some embodiments.

FIG. 2A illustrates selective components of a management server 200 used to perform the policy-based enterprise security management over a cloud environment, according to some embodiments. Management server 200 may be used by a user (e.g., a security operator for an enterprise cloud environment) directly or indirectly (e.g., via communications with a user device operated by the user) to perform the functionalities described herein. As depicted in FIG. 2A, management server 200 includes a security application 202. Security application 202 in turn includes an asset management component 204 and a policy management component 206 responsible for processing and analyzing the information received by management server 200. Management server 200 also includes additional components shown in FIGS. 9 and 10 below. The depicted components in FIG. 2, additional components in FIGS. 9 and 10, and any other components required for the operation of management server 200 are within the spirit and the scope of this disclosure.

Figure 2B:
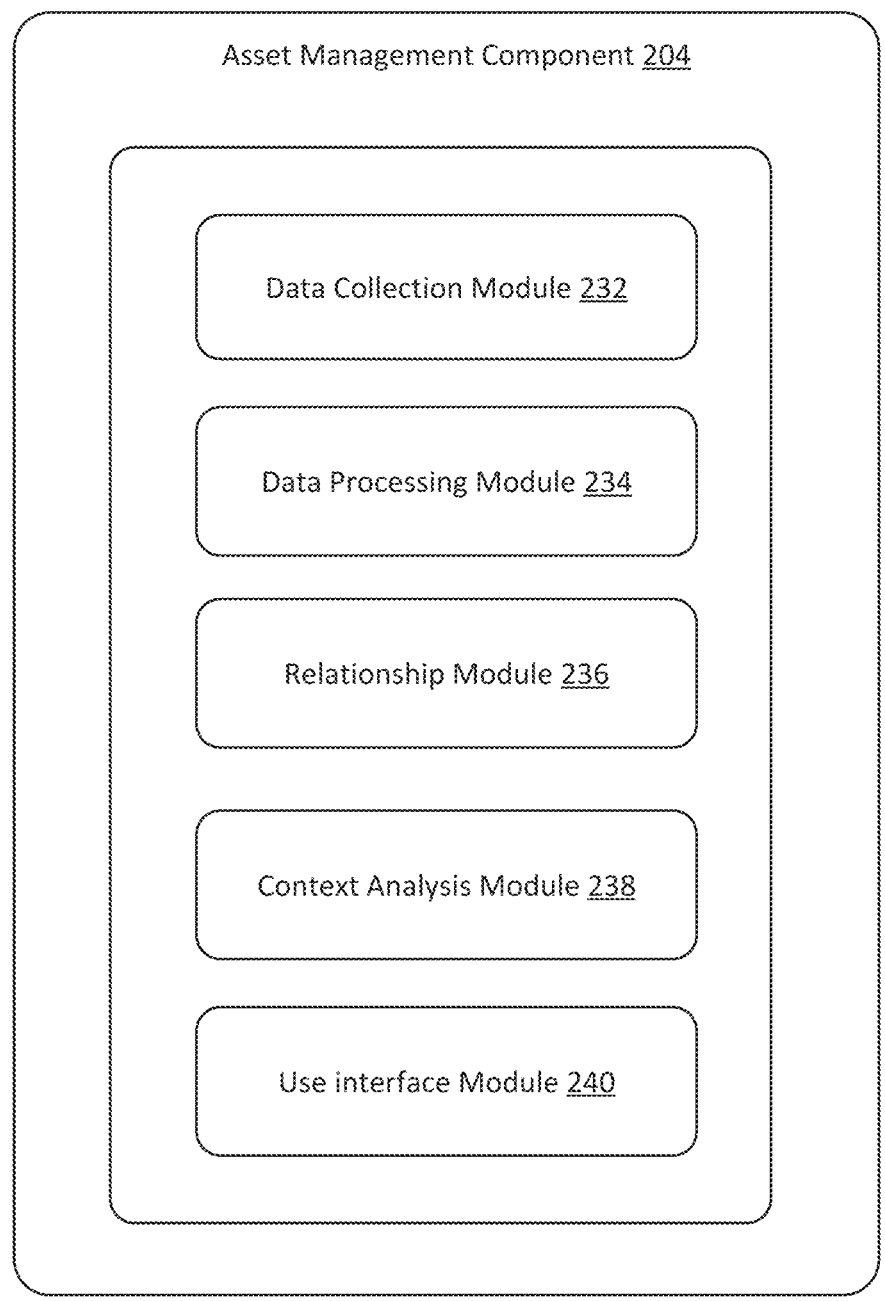
FIG. 2B depicts selective components of an asset management component, according to some embodiments.

In some embodiments, asset management component 204 may discover enterprise assets of a cloud environment, assess relationships among the enterprise assets, and generate virtualization of assets in the cloud environment. Asset management component 204 may also evaluate and virtualize security risks associated with the enterprise assets. These functionalities mainly correspond to the procedure of creating deep contextual visibility in 102 of FIG. 1. FIG. 2B depicts the components of asset management component 204 that perform the functionalities. In the illustrated embodiment of FIG. 2B, asset management component 204 includes a data collection module 232, a data processing module 234, a relationship module 236, a context analysis module 238, and a user interface module 240.

Figure 2C:
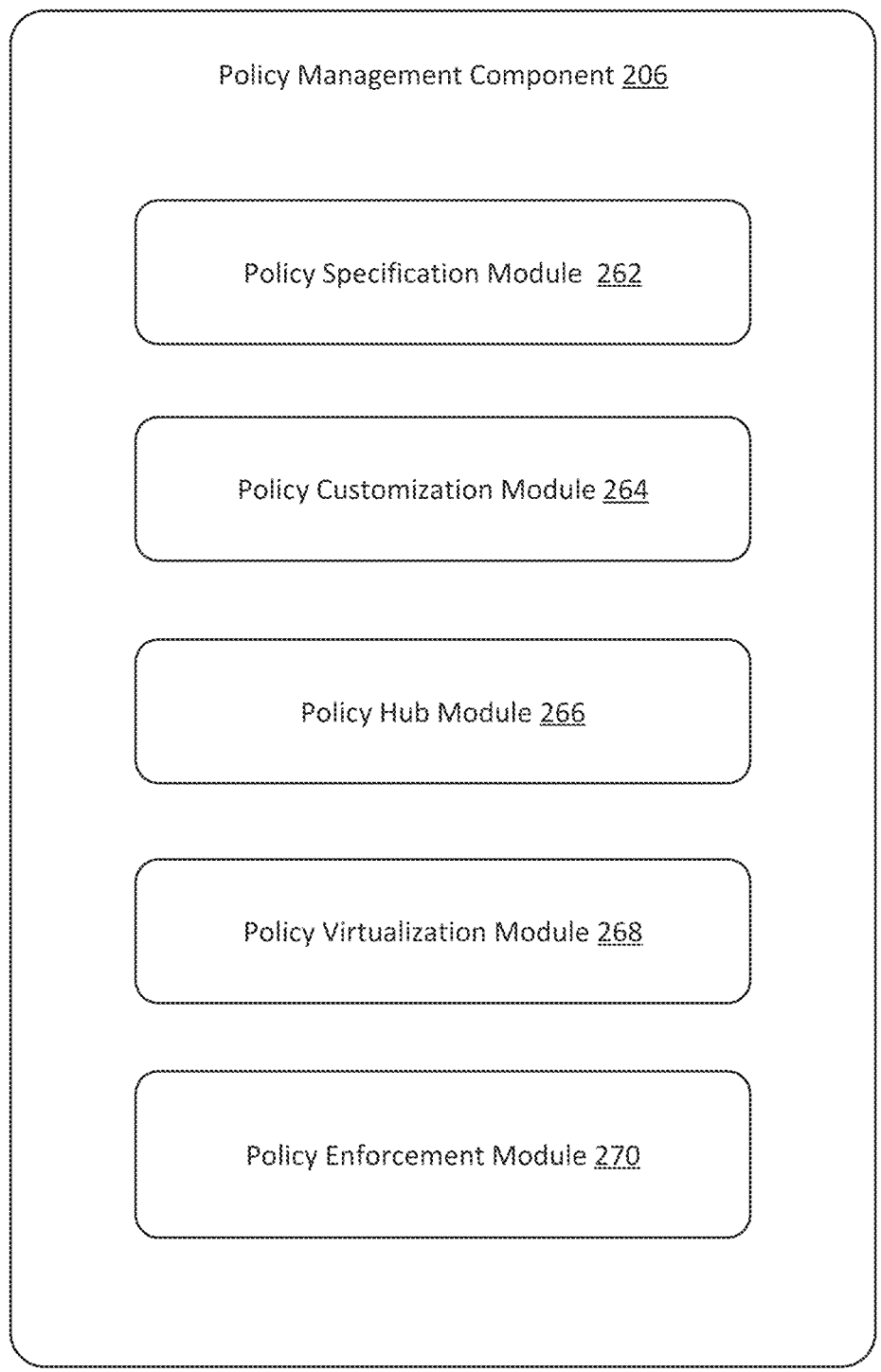
FIG. 2C depicts selective components of a policy management component, according to some embodiments.

Based on the information received from asset management component 204, policy management component 206 may configure and generate policies and enforce the policies on the cloud environment. Policy management component 206 may also monitor the enforcement of the policies and update the policies. These functionalities mainly correspond to cloud independent policy management at 104 and collaborative policy enforcement at 106 of FIG. 1. FIG. 2C depicts the components of policy management component 206 that perform these functionalities. In the illustrated embodiment of FIG. 2C, policy management component 206 includes a policy specification module 262, a policy customization module 264, a policy hub module 266, a policy virtualization module 268, and a policy enforcement module 270.

Figure 3:
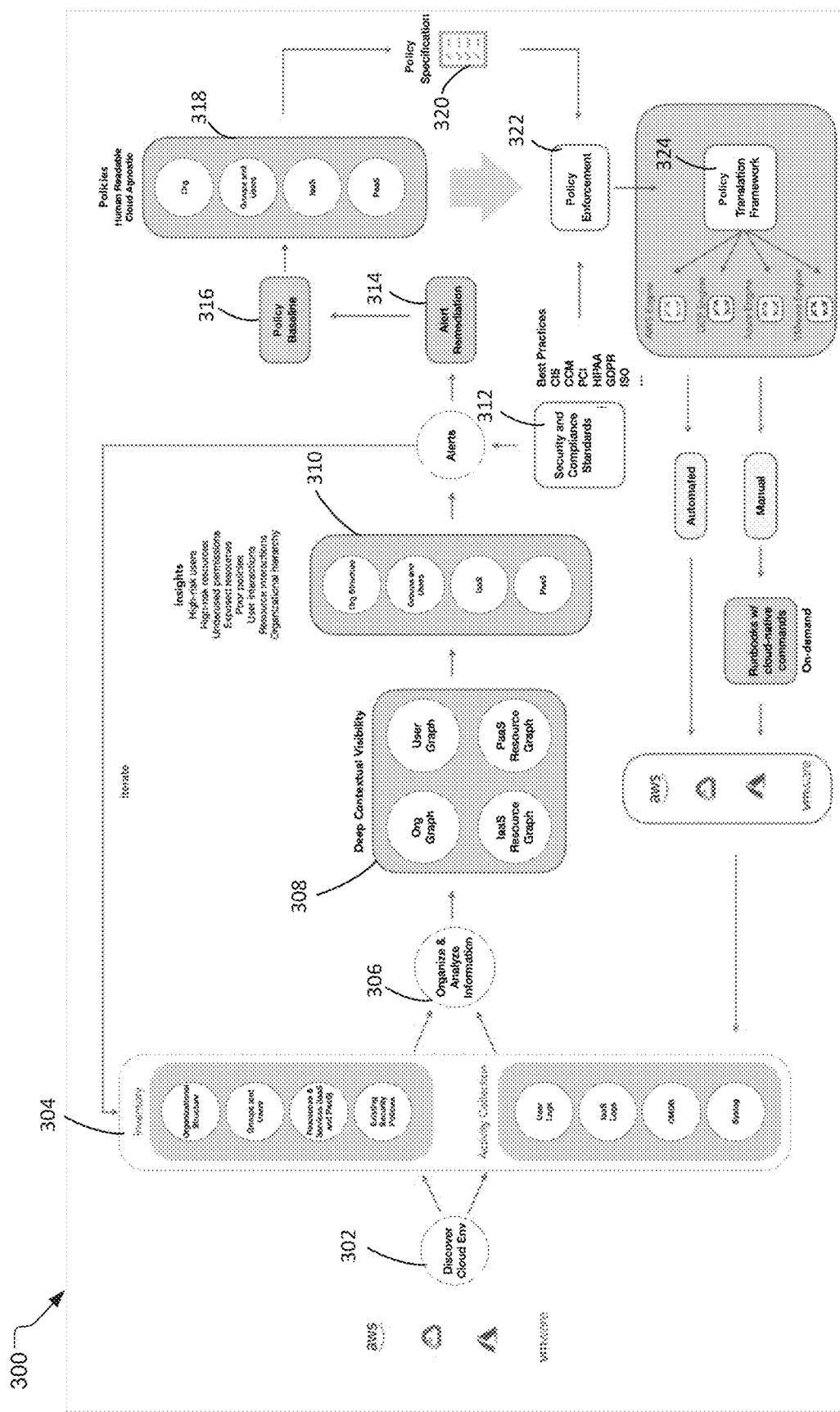
FIG. 3 illustrates an overview of a procedure for providing policy-based security management in an enterprise cloud environment, according to some embodiments.

Various functionalities performed by asset management component 204 and policy management component 206 in communication with other components of a cloud computing environment will mainly be described in accordance with the procedure shown in FIG. 3 and with reference to other FIGS. 4-10. In some embodiments, management components and modules, services (described below) may communicate with each other through Kafka topics.

Cloud-Based Assets Management

Discovering Cloud-Based Assets

FIG. 3 illustrates an overview of a procedure 300 for providing policy-based security management in a cloud-based enterprise environment. Procedure 300 starts with discovering a cloud computing environment in 302. The discovery usually includes obtaining inventory or enterprise assets on one or more clouds (e.g., public, private, or hybrid), as well as obtaining activities associated with the inventory/enterprise assets, as shown in 304.

In some embodiments, data collection module 232 of asset management component 204 may provide an inventory collector service to discover cloud-based inventory/enterprise assets and activity data. The cloud-based enterprise assets include a multitude of identities (e.g., user identities, machine identities, service identities, etc.), other inventory assets (e.g., infrastructure resources, platform service resources, cloud services, security policies, permissions & privileges, configurations, etc.), and entities (e.g., organizations, business units, teams, operating environments, etc.). Data collection module 232 may identify and store the data related to the cloud-based inventory/enterprise assets in an enterprise asset database. For example, for a virtual machine, data collection module 232 may collect the data including, but not limited to, operating system, computer system name, IP subnet, gateway, one or more IP Addresses, hardware characteristics such as processor count, processor speed(s), drive count, drive type(s), drive size(s), total memory, etc. For other enterprise assets, data collection module 232 may collect and ingest other data such as identities, services, roles and permissions, policies, etc. Furthermore, data collection module 232 may capture the data of activity related to the enterprise assets that occurred in the cloud computing environment. For example, data collection module 232 may identify and store the data about logins, access, or actions such as read, list, update, delete, edit, etc.

In some embodiments, data collection module 232 may automatically discover the enterprise asset data and the enterprise activity data based on messages from an onboarding service. In other embodiments, data collection module 232 may also collect the data of cloud-based enterprise assets and/or activity through an application programming interface (API), a database query, a file import, or manual data entry. For example, data collection module 232 may retrieve the enterprise asset and/or activity data from an enterprise asset database that stores the messages from the onboarding service. In another example, data collection module 232 may collect the enterprise asset and/or activity data using a representational state transfer (REST) API. In some embodiments, data collection module 232 may collect the data present in a public cloud (e.g., Amazon® Web Services, Google® Cloud, Microsoft® Azure) from common identity providers (e.g., Microsoft® Active Directory, Azure Active Directory, Okta®).

In some embodiments, data collection module 232 may communicate with other modules (e.g., data processing module 234, context analysis module 238) to continuously monitor and update the enterprise asset data and the enterprise activity data in real time. For example, the data changes such as addition, deletion, or other updates are monitored. The detected data changes may then be used, in real time, to update one or more databases (e.g., asset database, graph database), and further to propagate and reflect on one or more virtualizations (e.g., graphs described below).

Once the cloud-based enterprise asset data and activity data are collected, procedure 300 moves to 306 to organize and analyze the collected data. In some embodiments, data processing module 234 of asset management component 204 may provide an inventory processor service to evaluate and process the collected enterprise asset data (e.g., configuration, logs) and activity data. For example, data processing module 234 may classify the assets by clouds, organization units, groups, users, user types, resource types, or tags, etc. Data processing module 234 may also convert a cloud-native resource into a cloud independent representation. A "cloud native" or "cloud specific" entity ties to a specific cloud service provider and is only used in a specific cloud environment operated by the provider. A "cloud independent" or "cloud agnostic" entity is best suited in a multi-cloud environment and is generally applicable to each cloud of the multi-cloud environment regardless of the underlying cloud type and cloud service providers. For example, data processing module 234 may convert a cloud-specific machine name into a unified machine name. The processed data may be used in subsequent operations such as policy generation, policy enforcement, graph creation, etc. In some embodiments, data processing module 234 may communicate with other modules or services using Kafka topics.

Responsive to receiving the cloud-based asset and activity data from data processing module 234, relationship module 236 of asset management component 204 may provide an inventory relationship service to reveal stated and unstated relationships among users, machines, or other cloud-based entities and/or assets of the enterprise. In some embodiments, relationship module 236 may use inventory, configuration, and activity data to populate an enterprise relationship database or graph database (e.g., a Neo4j® database) to represent relationships and dependencies. For example, based on analyzing the activity data (e.g., time, frequencies) among a set of cloud-based assets, relationship module 236 may determine or infer relationships among the assets.

In other embodiments, relationship module 236 may also determine the relationships among the cloud-based assets based on policies attached to (e.g., assigned to or associated with) the assets. Policies are rules and regulations adopted by an enterprise to protect its assets from security threats and to handle the situations when threats do occur. The activity data (e.g., time, frequencies) may indicate to what extent a relationship is active, while a policy may signal the existence of the relationship. For example, relationship module 236 may process policies to obtain the information about whether a first asset (e.g., user asset or non-user asset) can be accessed by a second asset (e.g., user asset or non-user asset), whether the access is direct or indirect, and what an access path might be, etc. Based on the obtained information, relationship module 236 may determine the permission given to the first user and whether the first user is using or not using the permission, and further determine whether there is a relationship between the first and second assets. Therefore, even in the absence of current activity, relationship module 236 may also determine the relationships among the assets.

In some embodiments, relationship module 236 in communication with data processing module 234 may analyze the enterprise asset data and the enterprise activity data to generate the cloud-specific data describing the relationships among a set of cloud-based assets, and convert the cloud-specific data describing the relationships into cloud-independent representations of the set of cloud-based assets. Relationship module 236 may store the cloud-independent representations in the enterprise relationship database and/or transmit the cloud-independent representations to context analysis module 238 for creating virtualizations or graphs.

Delivering Deep Contextual Visibility and Insights

Once the relationships among the assets are converted into cloud-independent representations, in some embodiments, context analysis module 238 may create at least one graph using the cloud-independent representations and store the created graphs in a graph database. In some embodiments, the graph database may include one or more organization graphs, user graphs, and resource graphs. Each graph may represent the relationships, dependencies, and interactions among at least a set of enterprise assets in the cloud environment. Specifically, a graph may include a set of nodes and a set of edges. The set of nodes represents the set of enterprise assets. The set of edges represents the relationships among the set of enterprise assets, and each edge in the set of edges is incident on a respective pair of nodes in the set of nodes. Each of the organization graphs, user graphs, and resource graphs will be detailed below with reference to FIGS. 4A-4C.

The initially created graphs are then used by context analysis module 238 to evaluate the security risks in the cloud environment, and further refresh the graphs in real time to virtualize the security threats, as shown in the deep contextual visibility analysis 308 and insight analysis 310 of FIG. 3. In some embodiments, context analysis module 238 of asset management component 204 may conduct a security investigation based on one or more graphs to identify and analyze security threats and/or risks in a cloud environment. Responsive to the security investigation over the one or more graphs, context analysis module 238 may generate one or more insights, and then generate and display a visualization of at least one insight.

In some embodiments, context analysis module 238 provides an inventory analysis service to perform multi-dimensional analyses using the data of relationships, dependencies, interactions, asset data, and/or activity data. Context analysis module 238 may perform the multi-dimensional analyses to uncover hidden security threats, e.g., caused by poor configuration, poor policies, siloed data, lack of knowledge, etc. For example, context analysis module 238 may detect erroneous configuration for users and resources, analyze user and resource activities, and analyze service activities. Context analysis module 238 may also correlate configurations and activities, detect vulnerabilities and threats due to misconfiguration and activities, and prioritize alerts based on deep context to reduce alert flooding.

Based on the multi-dimensional analyses, context analysis module 238 may generate and add a visualization of one or more insights to one or more graphs. The visualization or visual representation may be in different forms, shapes, colors, etc. In some embodiments, an insight may be a contextual insight or an actionable insight. The contextual insight provides information relevant to a cloud-based asset such as roles and policies attached to an asset, a classification of the asset, tags associated with the asset (e.g., active or inactive, risky or normal, a risk level), etc. Context analysis module 238 may display the visual representations of one or more contextual insights in various graphs. The actionable insight is an insight that can trigger action, e.g., an alert. In some embodiments, context analysis module 238 may discover and prioritize the set of actionable insights based on the relationships among the assets. For example, unauthorized access from a user may be labeled as high risk because the user has an important role in an enterprise. In some embodiments, context analysis module 238 may also traverse a graph to identify an attack path associated with a potential security risk represented by an actionable insight. The attack path explains how a cloud-based asset may be exposed to a security risk, directly or indirectly. For example, an attack path may show that a first machine is exposed to the outside of the cloud environment because it connects to a second machine, and the second machine has a connection to a third machine that connects to the Internet. The attack path is crucial to efficient security management including remediation provision. In some embodiments, context analysis module 238 may instruct user interface module 240 to generate a visualization of the attack path.

In some embodiments, based on the contextual and actionable insights, context analysis module 238 may generate a suggestion including one or more remedial actions that respond to actionable insight. For example, the suggestion may include remediation steps such as changing a user role, changing permission, removing a connection, deleting a machine, etc. The suggestion may be generated based on an analysis of the contextual insights and/or policies applied to one or more cloud-based assets involved in the remedial actions. For example, context analysis module 238 may not suggest the deletion of a machine if the contextual insight shows that the machine belongs to a specific department and cannot be removed.

Context analysis module 238 may also determine the impact of the one or more remedial actions and instruct user interface module 240 to generate a visualization of the suggestion including the one or more remedial actions and/or the determined impact. That is, given the remedial actions, context analysis module 238 may determine which user identities or non-user identities may be impacted by the actions, to which users a notification should be sent, from which users an approval should be needed, etc. Context analysis module 238 may then include such impacts as well as the remedial actions in the graphs for presentation to corresponding users. In some embodiments, context analysis module 238 not only provides suggestions of remediation but also automates the remediation. For example, context analysis module 238 may learn the enterprise's preferences for remediation and apply the preferences prospectively, e.g., to generate future remediation suggestions that an enterprise user can perform or to automatically perform the remedial actions for the user.

In some embodiments, context analysis module 238 may also continuously monitor the changes in the cloud environment. When detecting a change that triggers the re-assessment of asset and activity data and/or security risks, context analysis module 238 may instruct user interface module 240 to refresh the related graph(s). As a result, the updated graphs (e.g., organization, user, or resource graph) can provide a visually intuitive, interactive graphical layout in a 360° view to deliver rich context (e.g., potential security risks, attack path, remediations, the impact of the remediations) in real time.

The deep contextual visibility analysis in 308 and insight analysis in 310 are advantageous in many aspects. Context analysis module 238 allows security risks to be identified and highlighted in various graphs with intuitive, visual representations, whereas existing systems cannot identify hidden user and resource blind spots, over-provisioned users, or risky resource permissions and privileges. The intuitive, visual representation of security risks may enable context analysis module 238 to perform identity permissions and governance for least privilege management, for example, enforcing least privileges for user and machine identities continuously and in real-time in the cloud environment.

Advantageously, the intuitive, visual representation of security risks also accelerates security investigation and remediation. When a threat is determined to be remedial based on a security investigation, remediation or remedial action may be taken to prevent the potential harm resulting from the threat. Context analysis module 238 may perform scalable and proactive monitoring in real time to facilitate continuous drift detection and automated remediation. Based on the monitoring and analysis, context analysis module 238 may conduct real-time impact assessment of changes (e.g., a remedial change to existing configuration) to ensure the remediation is error-free and/or easy to roll back (e.g., if any mistake occurs). In contrast, existing policy management systems lack the one-time remediation mechanism, the assessment mechanism for error-free remediation, and the automation mechanism for proactively performing the remediation.

In some embodiments, context analysis module 238 may use a security policy language that is human-readable and cloud-independent in performing the multi-dimensional analyses, i.e., the deep contextual visibility analysis 308 and insight analysis 310. Advantageously, using this language, context analysis module 238 may simplify codification and customization of customer policies or specifications. Context analysis module 238 may also automate the translation and enforcement of cloud independent policies to each public cloud for all identity permissions and governance and configuration management. The codification, translation, and enforcement of policies (e.g., cloud independent or cloud-native) will be further described below.

Advantageously, context analysis module 238 may further process and analyze massively scalable data such that the efficient and continuous insight analysis may be implemented for large and distributed cloud environments. Also, context analysis module 238 may allow the integration of a broad range of cloud-native services and/or third-party vendor information to obtain a comprehensive and accurate analysis.

User Interactions with Graphs

Context analysis module 238 may instruct user interface module 240 to generate graphical data and display one or more graphs to a user. The user may be a security operator of an enterprise, an enterprise authority, etc. Each graph may show a visually intuitive, graphical layout of at least a set of cloud-based assets and their relationships, dependencies, and interactions. Each graph may also include the visual representations of contextual insights, suggestions for remedial actions responding to actionable insights, and the impact of performing the remedial actions in the suggestions.

A contextual insight may tell a user what is happening in the cloud environment. For example, the presence of a virtual machine in color may indicate a risky level of the VM, and intuitively guide the user on how to prioritize the security operations. If the contextual insight shows this VM belongs to a key department, the security threat is prioritized, and a red visual representation may alert the user to take immediate remediation. Otherwise, a yellow visual representation may tell the user that the VM is risky but is temporarily controllable.

One unique and distinguishing feature is that the graph can show an attack path associated with an asset to the user. Assume that the VM is risky because of a direct or indirect potential exposure to an outside network (e.g., the internet). The graph can be analyzed hops-by-hops from the VM to determine if any non-user assets on the hops have connected to the outside network or if the outside network has accessed them, if the VM is assigned to a specific group, or if the VM belongs to a specific user, etc. In this example, the attack path may tell the user that this particular VM is of high risk because it connects to machines A and B. The processing of the graph may further show that machines A and B are high risky because of similar or other security issues. The graph, therefore, shows multiple high risky non-user identities and/or user identities that are connected via an attack path.

Once the user visually understands the graph, the user may determine whether to take remediation, e.g., based on the suggestion(s) provided by context analysis module 238. A suggestion may include one or more remedial actions and the impact on actions. If the contextual insights related to the VM indicate that this VM has certain important roles, the user will get the suggestion regarding mere software patches or permission changes rather than machine deletion. However, if the VM is not important, the user may be suggested to delete it. In the meantime, the suggestion also tells the user to whom the user should notify, from whom the user should get approval, with whom the user should cooperate, etc. If the user performs the remedial actions by notifying, getting approval, and cooperating with others, the suggestion also tells the user what the impact will be, for example, a different machine will lose connectivity, a service will be terminated, etc. This not only facilitates the implementation of error-free remediation, but also optimizes security investigation with unique identifiable information about security issues, remediation, and impacts.

Graph Views

The present security system helps customers or enterprises build a baseline for their organizational policies. To build this baseline, the policy-based security management procedure 300 in FIG. 3 includes steps such as discovering inventory/assets in the enterprise's existing cloud environment in 302, 304, and 306, assessing the impact of current configurations on permissions and privileges (e.g., at the organization level, user level, and resource level) in 308, identifying over-provisioning of permissions and privileges in 308 and 310, and suggesting potential remediation to correct permissions and privileges without impacting productivity in 312 and 314. Procedure 300 may also include monitoring and capturing customer changes in the cloud environment. When any customer changes to security configuration in the existing cloud environment are detected (e.g., in 302-308), procedure 300 may re-evaluate over-provisioning and update the recommendations (e.g., in 310-314). This robust mechanism not only ensures that the organizational, user, and resource permissions and privileges are appropriately sized, but also enables the impact assessment from unintended consequences. For example, a revoked permission may impact users and resources more than the originally intended permission.

The present security system, as explained in FIG. 3, delivers deep contextual visibility into an enterprise's cloud environment through specific graphical views. In some embodiments, the specific graphical views include an organization graph, a user graph, and a resource graph.

An organization graph provides an overall view of organizational structure, hierarchy, and relationships among the cloud-based assets of the enterprise. The organization graph also reflects the application of policies in each hierarchy since the policies define and measure each hierarchy. In some embodiments, the present system, e.g., by data collection module 232, data processing module 234, and relationship module 236, may perform continuous, real-time discovery of various organizational structures. Based on the discovered assets and associated relationships, the present system, e.g., by context analysis module 238 and user interface module 240, may carry out multi-dimensional analyses of the structure to generate an analytics-based 3600 view of the entire organizational structure as an organization graph. The organizational structure may include organizations, business units, environments, groups of users and individual users, their relationships, existing security policies, real-time interactions, etc.

Figure 4A:
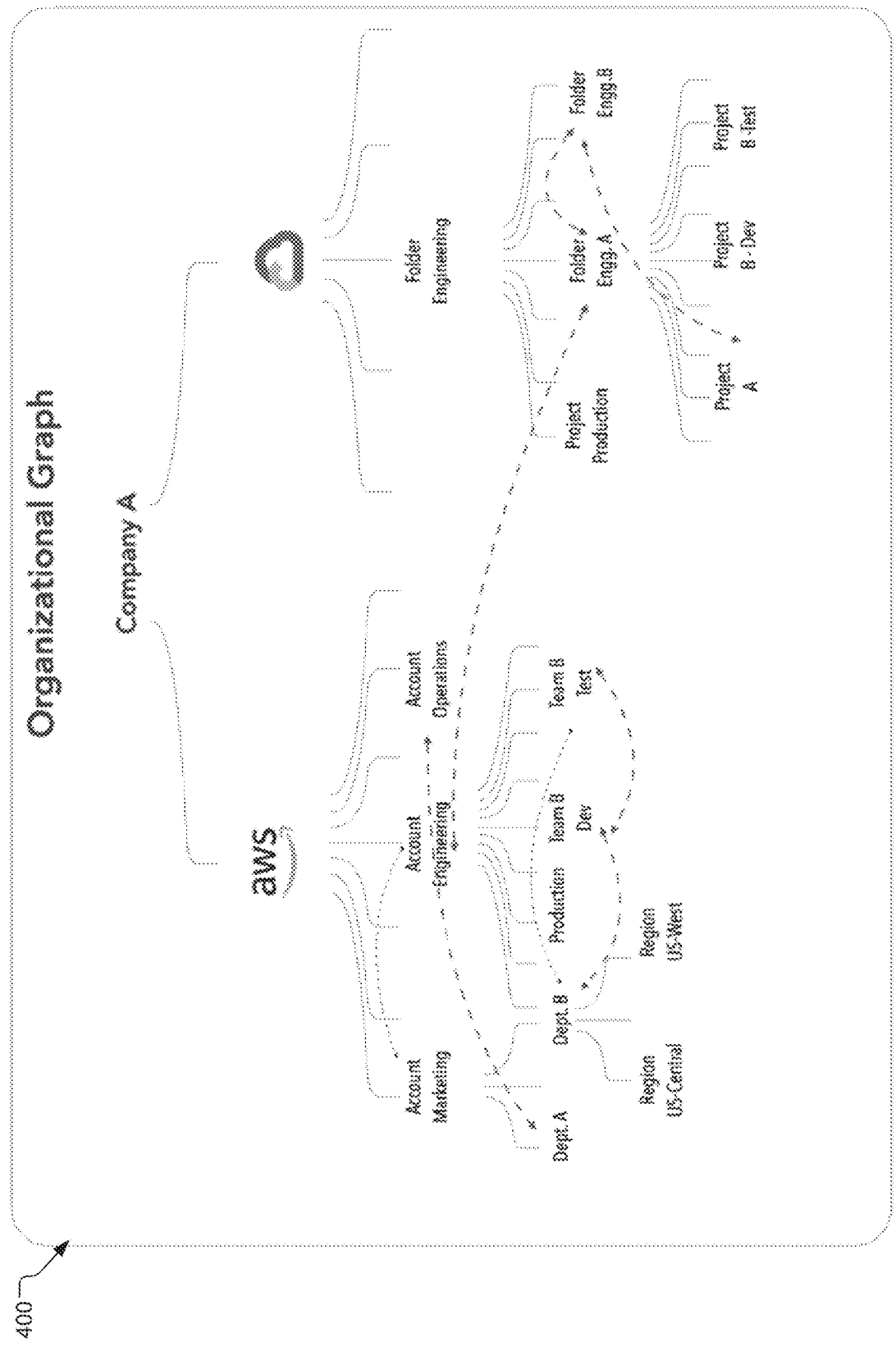
FIG. 4A is an example organization graph, according to some embodiments.

In some embodiments, an organization graph may identify and uncover hidden potential security risks, entry points for threats, poor hygiene for permissions and privileges, etc. These identified issues potentially increase the overall risk of external and insider threats. For each organization, the organization graph may provide a panoramic view to answer the questions of what organizational entities are included, how policies are managed and applied, whether and what security risks may exist, etc. The 360° real-time organizational view may simplify and accelerate investigation by providing a focused, intuitive, and highly responsive graphical layout generated based on real-time analysis. This real-time analysis may also monitor the changes in the cloud environment and allow the organizational graph to be updated to reflect the changes. Moreover, the organizational graph may enable robust policy implementation by eliminating policy sprawl, identifying hidden policies, revealing complex policy management, etc. FIG. 4A illustrates an example organization graph 400, in which the organizational structure of company A and relationships among the origination units (e.g., company departments) are depicted. The bidirectional dashed arrows represent the accessibility and interactions/activity between the origination units.

A user graph is a real-time user-centric view that maps user identities with associated activities and/or access permissions to other cloud-based assets in a cloud environment. For each user, the user graph is a comprehensive map that shows at least:

- machine entities the user has access to, indicating what the user can access;
- permissions and privileges assigned to the user, indicating what actions the user can take;
- access activity associated with the user, indicating how the user was accessed; and/or
- past actions of the user, indicating what actions were taken by the user at what time and how often the user took an action, etc.

Figure 4B:
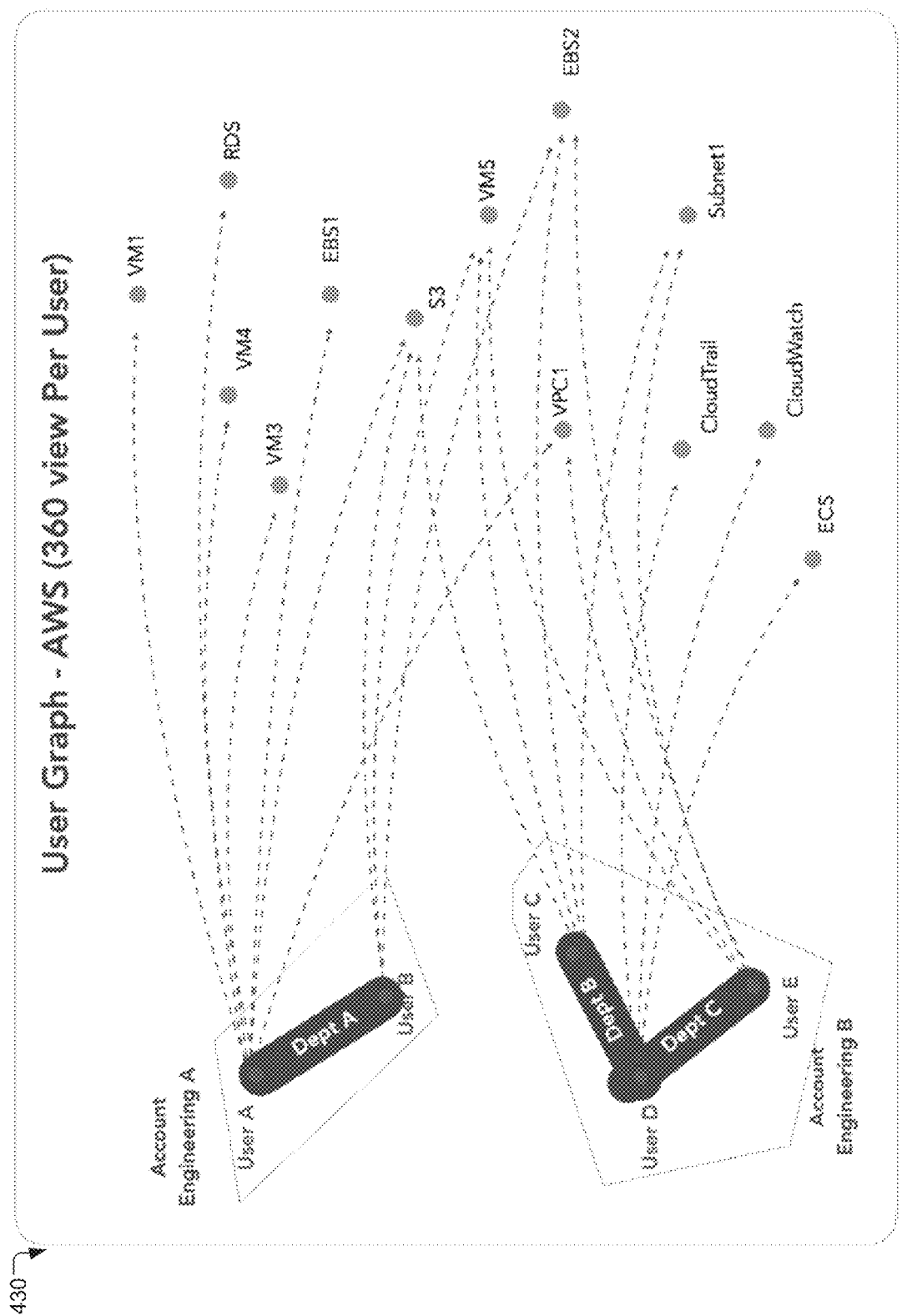
FIG. 4B is an example user graph, according to some embodiments.

The user graph therefore provides a simple, intuitive, and focused security investigation regarding the cloud-based risks and threats, rather than a slow, error-prone, and complex investigation posed by problematic users in existing security management systems. The user graph also provides the user a real-time view of the potential impact associated with a security threat, remediation therefore can be carried out to resolve every security risk with high confidence and a low error rate. FIG. 4B illustrates an example organization graph 430, in which accounts, resource types, and resources that a user has access to or real-time interaction with are depicted. The bidirectional dashed arrows represent the accessibility and interactions/activity between users and resources.

A resource graph is a real-time map between a non-user identity with other non-user identities and/or between a non-user identity with other user identities. Putting differently, the resource graph is a non-user asset centric view representing relationships, dependencies, access permissions, or activity of non-user assets with user identities of the plurality of cloud-based assets. In some embodiments, a resource graph may be a resource-user graph or a resource-resource graph.

A resource-user graph is a comprehensive, real-time 360° map that shows at least:

- all user entities (e.g., groups, organizations, etc.) that have access to a resource, indicating who can access a resource;
- permissions and privileges assigned to the user, indicating what actions the user can take;
- paths of interaction, indicating how interaction is conducted;
- access activity, indicating how the resource was accessed, at what time, and how often the resource was accessed; and/or
- past actions, indicating what actions were taken.

The resource-user graph together with the user graph provides a complete picture of all user and machine identities in an enterprise or customer's cloud computing environment, as opposed to the absence of a machine-centered and interaction-oriented view in the existing cloud-based security management system.

A resource-resource graph is a comprehensive, real-time 360° map of interactions, relationships, and dependency between resources, which is particularly useful in a public cloud environment, where machines constantly interact with other machines. In some embodiments, the resource-resource graph shows at least:

- all other machines or non-user entities that have access to a machine in question, indicating who can access a resource;
- permissions and privileges assigned to the user, indicating what actions the user can take;
- access activity, indicating how the user accessed the resource; and/or
- past actions, indicating who took an action, and at what time and how often the action was taken.

The resource-resource graph is unique and critical, especially in public clouds that include many identities other than user identities. Since machine or non-user identities usually operate at high velocity, agility, and scale, the resource-resource graph is particularly useful when handling and tracking down the security risks that are created in a very short time period but persist for a long time. Existing security management systems lack the capabilities to help customers gain insights into security risks for machine-to-machine interactions.

Figure 4C:
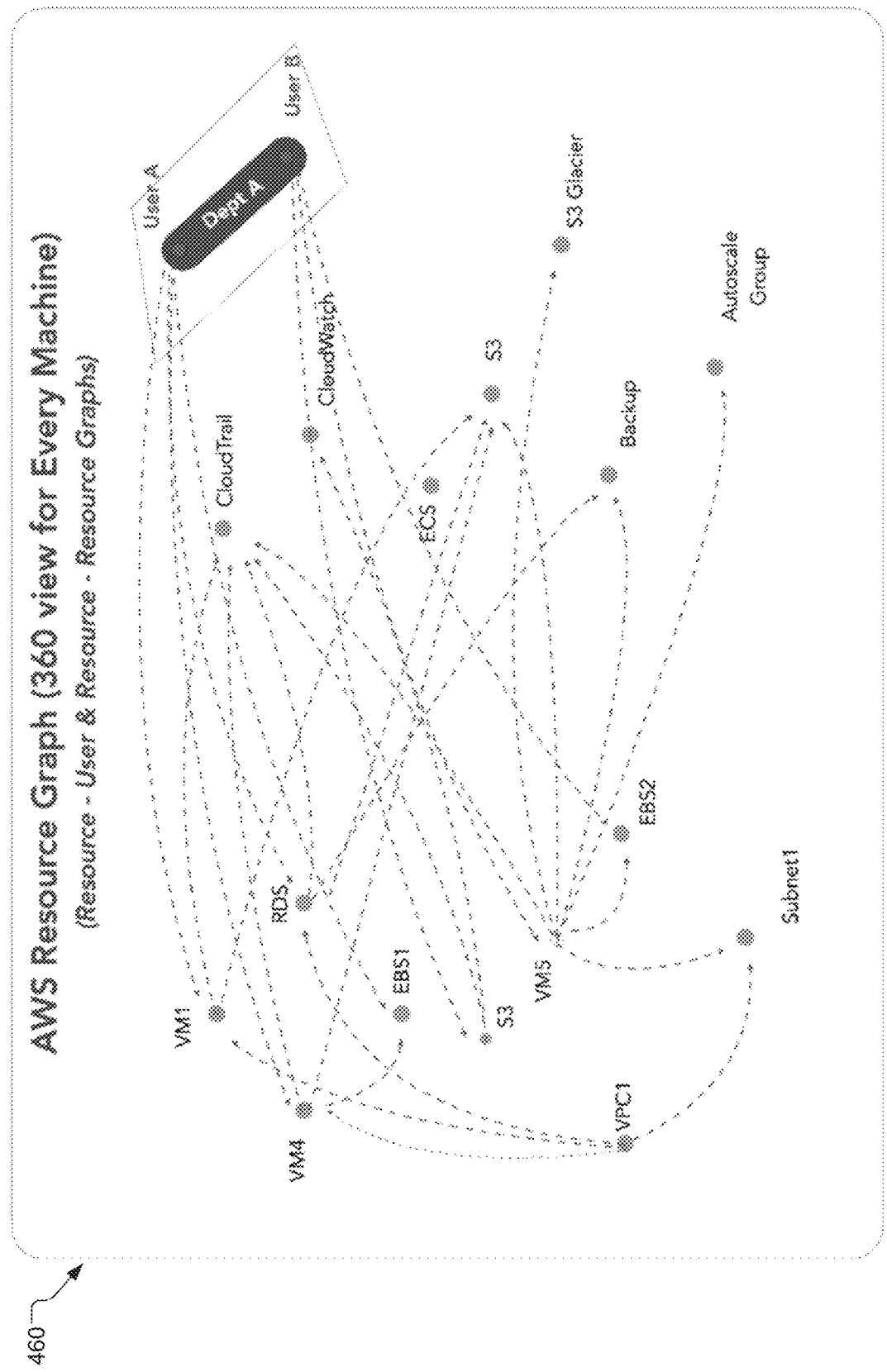
FIG. 4C is an example resource graph, according to some embodiments.

FIG. 4C illustrates an example resource graph 460, in which information for both resource-user relationships and resource-resource relationships are depicted. The bidirectional dashed arrows represent the accessibility and interactions/activity between users and resources as well as between different resources.

Graph and Insight Example

Figure 5:
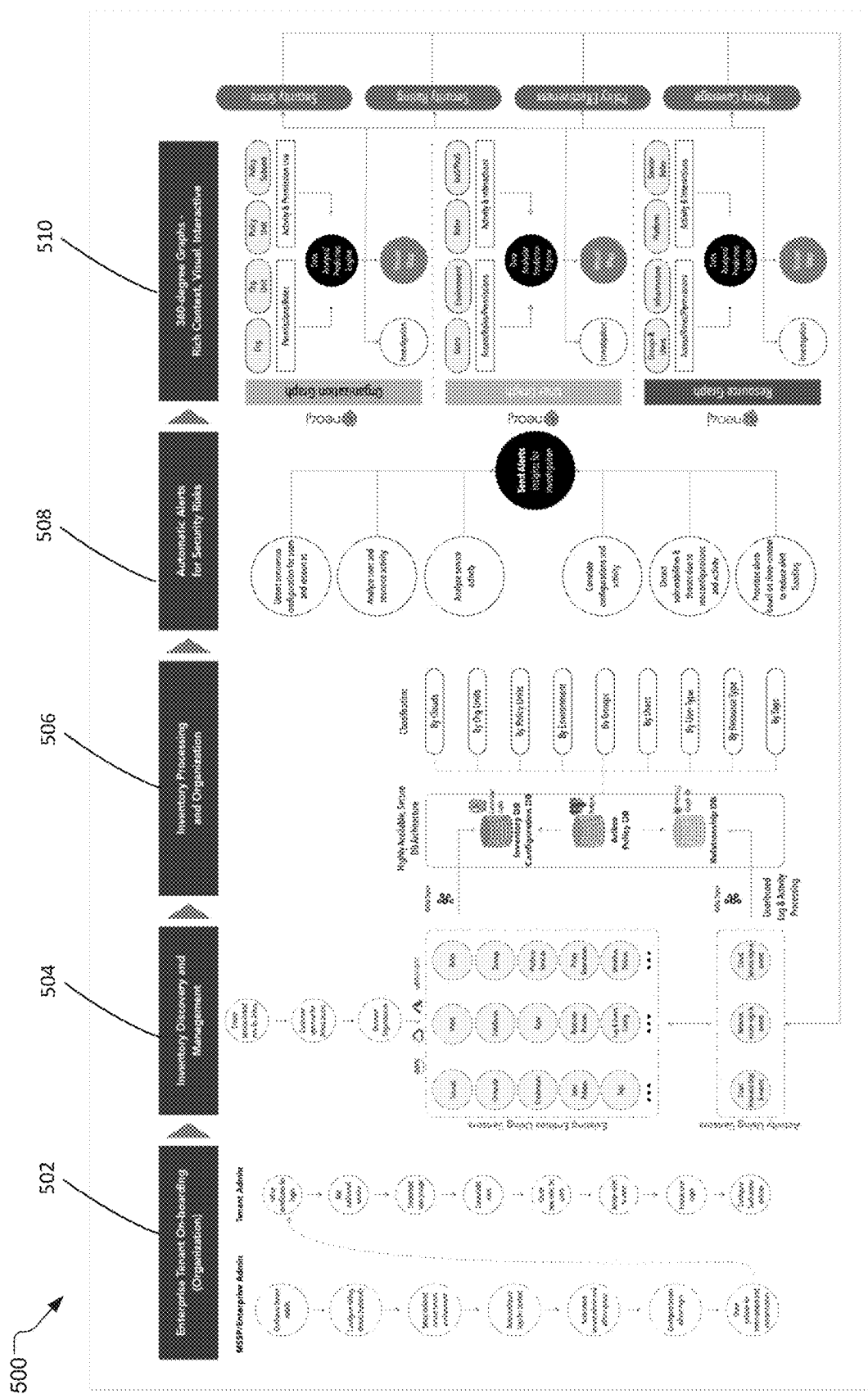
FIG. 5 summarizes a process flow of delivering deep contextual visibility and insights in a cloud environment of an enterprise, according to some embodiments.

Here is an example of delivering deep contextual visibility and insights in the form of organization, user, and resource graphs. FIG. 5 summarizes a process flow 500 of delivering deep contextual visibility and insights in a cloud environment of an enterprise. As described above in FIG. 3 and also shown in FIG. 5, after an enterprise onboarding service starts at 502, the inventory or cloud-based enterprise assets and activities are discovered at 504 and processed at 506. At 504, the asset data (e.g., data of groups, users, applications, policies) can be collected from messages of onboarding service or retrieved later from an enterprise asset database, e.g., by data collection module 232. The activity data can also be discovered from various logs and events including at least user and resource logs, network access logs, and cloud service logs, e.g., by data collection module 232. At 506, the collected asset and activity data can be classified, converted to cloud-independent data, and processed, e.g., by data processing module 234. The data is also processed to detect the relationships between the cloud-based enterprise assets, e.g., by relationship module 236. The processed data is then forwarded to 508 and 510, where context analysis module 238 performs multi-dimensional analysis to deliver deep contextual visibility and insights.

Context analysis module 238 first generates one or more graphs to represent the relationships among at least a subset of cloud-based enterprise assets. Context analysis module 238 may then uncover potential security risks and generate one or more actionable and/or contextual insights, suggestions of remedial actions, and/or impact of the remedial actions. In some embodiments, context analysis module 238 may communicate with one or more modules of policy management component 206 (described below) to generate the insights, suggestions, and/or impact. Upon the generation of contextual insight(s), context analysis module 238 along with user interface module 240 may generate and display a visualization of the contextual insight(s) on at least one of the organization, user, and resource graphs. The view of the graphs may provide a user or a persona with an intuitive and comprehensive understanding of the cloud environment. Depending on various types of users or personas, context analysis module 238 may generate different contextual and/or actionable insights as shown below.

User A is a security practitioner. When one or more graphs are presented to user A, context analysis module 238 may generate contextual insights about configuration, permission (e.g., given and/or used), intra-boundary and inter-boundary access related to cloud-based enterprise assets. These contextual insights may be represented by visual representations on the graphs. Context analysis module 238 may also generate actionable insights such that an action can be taken to minimize insider and external threats. The actionable insights may include users and/or resources whose permissions and privileges have been over-provisioned, and specific recommendations for remediating the difference to establish a productive zero-trust access model for users and resources. In some embodiments, an alert is sent to user A for taking actions based on the actionable insights.

In some embodiments, an organization graph is presented to user A. Based on the organization graph, user A should be able to navigate organizational structure, hierarchy, relationships, trust boundaries, and policies that provide users or machines (e.g., infrastructure and platform service instances that are not users) permissions to perform actions. User A can easily understand what policies are in effect, where the policies are applied, and the impact of the policies on security risks. For an enterprise, the organization graph is critical in implementing policies in an efficient way that keeps policy management simple while allowing security to scale across geographically distributed users.

In some embodiments, context analysis module 238 may generate and display virtualizations of contextual insights on the organization graph. The contextual insights include:
- enumeration of organizations, organizational units, accounts or subscriptions, environments, and/or projects;
- enumeration of policies that have been provisioned at organizations, organizational units, accounts or subscriptions, and/or groups and environments;
- policies applied at organizations, organizational units, accounts or subscriptions, and/or groups and environments, wherein the policies may be categorized by entity types such as groups, users, computers, storage, databases, networks, etc.;
- policy coverage at organizations, organizational units, accounts or subscriptions, and/or groups and environments;
- policies effectiveness at organization, organizational units, accounts or subscriptions, and/or groups and environments; and/or
- insights into access and activity within, across, and outside organizational boundaries.

For the organization graph presented to user A, context analysis module 238 may also generate actionable insights that include:
- critical security policy violations and violations of medium severity;
- compliance policy violations;
- policies (e.g., by category) that have been assigned at a user level (e.g., assigning minimum policies at aggregated levels);
- policies that are set up at aggregation points and apply permission/privileges across different accounts, departments, or environments;
- policies that are set up at aggregation points and automatically apply to critical accounts/resources;
- policies (e.g., by category) that permit access by users and non-users from other accounts;
- accounts that have the highest cross-account access permissions
- accounts that have the highest actual outbound cross-account access;
- accounts that have the highest actual inbound cross-account access and internal access;
- accounts that have the highest access from an outside cloud;
- accounts that have multiple regions of use; and/or
- entities that have incorrect, inconsistent, and/or missing tags.

In some embodiments, a user graph is presented to user A. Based on the user graph, user A should be able to quickly uncover inactive users and groups, discrepancies between their personas and permissions, over-provisioned permissions/privileges that need to be right-sized against actual needs (rather than assumed needs) based on multi-dimensional analysis and real-time monitoring of user activity related to all infrastructure and platform services instances. The user graph shows specific resource access discrepancies to user A so that user A can see what user permissions are being granted, used, or needed, and appropriately remediate if necessary. The user graph may express existing cloud-native policies (abstracted by the present system) as well as policies provisioned by the present system.

In some embodiments, context analysis module 238 may generate and display, on the user graph, virtualizations of contextual insights. These contextual insights may be categorized as insights across users, insights per user, and insights across groups. The contextual insights across users may include:
- intuitive visual map of users by cloud, by account, folder, or subscription, and/or by groups or departments (e.g., using tags) such that the map includes a navigable hierarchy from cloud, domain, accounts, and/or groups;
- classification of users by access boundary such as within account, cross-account, and/or outside organization (e.g., unknown users represented with internet protocol (IP) address);
- classification of users by activity such as active and inactive users, along with a 30/60/90 day rolling period and an estimated trend;
- classification of users by risk such as high-risk users and/or medium risk users with an estimated trend;
- classification of users by capabilities such as users and administrators that have potentially more sub-categories;
- classification of users by failed user actions such as password failures, bad usernames, bad keys, invalid port connections, and failed connections from outside IP address; and/or
- enumeration of roles assigned to users, e.g., ordered by occurrences from most used to least used.

The contextual insights per user may include:
- user profile including username, administrator/user role, federated feature indicating where the user is provisioned such as active directory (AD) or cloud identity and access management (IAM), cloud/account, and/or classification (e.g., high/medium/low risk);
- membership such as group and/or department;
- roles and policies applied to the user;
- intuitive visual map of organizations, clouds (if federated), and/or accounts that the user can perform operations in (e.g., cloud services, computers, storage, network, logging, databases, credentials, etc.);

user activity in the last 30 days including logins, access, actions such as READ, LIST, UPDATE, DELETE, and/or activity type (e.g., user or administrative). The contextual insights relating to user activity can include more than raw activity, such as whether an activity is suspicious, unexpected, unrecognized, incorrect, corrupted, etc.;

all regions of user activity (e.g., in last 30 days); and/or various tags.

The contextual insights across groups may include an enumeration of groups classified by organization, organizational units, accounts, and/or user type (e.g., users or administrators).

The contextual insights per group of users may include:
roles and policies applied to group;
classification by groups and/or by activity, e.g., active and inactive groups, where an active group is a group including at least one active user;
classification by roles such as administrator groups or user groups
largest and/or smallest group by user membership; and/or various tags.

For the user graph presented to user A, context analysis module 238 may also generate actionable insights across users and per user drill-down. The actionable insights may include:
high and medium risk users determined based on permissions to list, get, Create, Update and Delete (CRUD);
users that have over-provisioned permissions (e.g., access, CRUD), which may be enumerated by clouds, accounts, roles and/or permissions;
users that belong to administrator and non-administrator groups;
users that have maximum group memberships, which may be enumerated by clouds and/or accounts;
excess or unused user permissions that can be revoked without impacting productivity;
users that have cross-account access and/or multi-cloud access;
lack of policies that allow unauthorized user access to cloud services;
lack of policies that allow users to modify cloud service configurations (e.g. logging configuration);
lack of policies that have allowed more than one region of use; and/or
entities that have incorrect, inconsistent, and/or missing tags.

In some embodiments, a resource graph is presented to user A. Based on the resource graph, user A should be able to navigate with real-time information on how machines can be accessed and are being accessed by users and other machines using the roles and permissions that have been defined. The resource graph allows user A to right-size permissions/privileges, detect abandoned/inactive resources, and/or prevent unauthorized access from outside intended access boundaries such as outside accounts, domains, or organizations. The resource graph also allows user A to quickly inspect credentials that are used or unused for accessing various resources so that the resources are appropriately managed and shared to minimize insider and external threats.

In some embodiments, context analysis module 238 may generate and display, on the resource graph, virtualizations of contextual insights. The contextual insights include insights across all resources and insights per resource. The contextual insights across all resources may include:

intuitive visual map or tree of resources by cloud, by account, and/or by department (e.g., using tags). The map/tree shows the navigable hierarchy to virtual machines (VMs), containers, networks (e.g., virtual private cloud, subnet, internet gateways, load balancers, application firewalls), access control lists (ACLs), security groups, databases, and/or credentials. The information is abstracted but also provides cloud-native views for transparency;

resource classification by type and/or by activity such as inactive or active resource associated with a historical trend;

resource classification by department;

resource classification by criticality; and/or quantity of each kind of resource provisioned along with a historical trend.

The contextual insights per resource may include:
resource details determined based on the resource type;
for each resource, showing the number of policies in effect, number of standards being applied, and/or active critical and medium alerts;
classification by activity such as active (e.g., including at least one access) or inactive;
users, services, or other resources that can access the resource based on policies;
users, services, or other resources that have been accessed (e.g., within a 30-day period);
user or IP access from outside organizations, outside accounts, or intra-accounts;
historical pattern of activity (e.g., within last 30 days) such as access, list, get, create, edit, update, and/or delete; and/or
various tags.

For the resource graph presented to user A, context analysis module 238 may also generate actionable insights per resource. These actionable insights may include:
resources from outside accounts that can access and have accessed (e.g., within 30 days);
resources from outside organizations that can access and have accessed (e.g., within 30 days);
users with CRUD on resources (e.g., high-risk and medium-risk users);
non-users with CRUD on resources (e.g., high-risk and medium-risk non-users);
anomalies determined based on the resource type, which increases exposure such as more open ports, public access, unrestrictive policies, etc.;
resources are of high-risk and medium-risk determined by need (e.g., best practices or compliance standards), where the risks may include a high number of open ports, services, activity, and access to sensitive data (e.g., based on tags); and/or
resources that have incorrect, inconsistent, and/or missing tags.

Context analysis module 238 in communication with user interface module 240 may also generate various graphs and associated insights to a different personal. User B is a high authority of the enterprise (e.g., chief strategy office). Context analysis module 238 along with other modules may generate graphs for user B to assess the overall security health of the existing cloud-based enterprise environment. These graphs may also allow user B to outline a policy-based strategy to deploy a simple, agile, and consistent model for managing policies for users and resources on any cloud. The virtualization of contextual insights allows user B to quantify risk and security health and understand periodic changes to risks.

Policy Management

Referring back to FIG. 3, operations of cloud-based enterprise asset management, such as determining relationships among assets in 306, creating graphs in 308, and performing contextual visibility analysis and insight analysis in 308 and 310, are all based on policy management. In some embodiments, policy management component 206 shown in FIG. 2A is responsible for building a policy management framework to organize, maintain, customize, and manage policies applied to these cloud-based enterprise assets. In FIG. 3, operations 316-324 are performed by policy management component 206 including a policy specification module 262, a policy customization module 264, a policy hub module 266, a policy virtualization module 268, and a policy enforcement module 270, as shown in FIG. 2C.

Policy Generation

In some embodiments, policy specification module 262 in communication with policy customization module 264 and policy hub module 266 generates policy bassline 316 and customizes it in 318 to obtain the customized policy specification 320. The customized policy specification 320 may then be applied to a specific cloud through an enforcement mechanism.

A security policy or policy is a human-friendly, intuitive, and vendor-independent definition of rules for how inventory assets (e.g., computer systems) may be configured or kept secure. A rule is a query for resources that match a specific set of configuration or attributes. In some embodiments, policy specification module 262 may include an API-driven interface to specify security policies (e.g., including policy baseline 316) for a cloud environment of an enterprise. The interface is a cloud-independent policy interface for generating, customizing, and viewing the cloud-independent policies. The cloud environment may include a single cloud, a hybrid cloud, or a multi-cloud. In some embodiments, once all cloud-based inventory/enterprise assets have been discovered and grouped, policy specification module 262 may generate security policies for the inventory groups. For example, policy specification module 262 may modify and restructure an established set of rules to match the configurations of the cloud and the inventory groups. In some embodiments, policy specification module 262 may also perform a policy consolidation process to resolve conflicting policies, remove repeat policies, etc.

Policy specification module 262 determines a set of rules for the discovered and grouped inventory assets based on the policy generation and consolidation processes. In some embodiments, based on an established set of rules that outline how inventory can be configured and what options are available, policy specification module 262 may modify and restructure the rules until these rules match the existing configurations or characteristics of each of the inventory groups. The modification of a rule may include either structure change (e.g., structurally changing how the rule is built) or parameter change (e.g., adjusting the values associated with a rule used for enforcement). In some embodiments, policy specification module 262 may also consolidate the generated rules by removing overlapping rules, resolving conflict rules, etc., until the rule is able to match to the group that it is being evaluated against.

The set of rules generated by policy specification module 262 is applied to the inventory assets and governs how the inventory assets are configured and used. This set of rules constitutes the enterprise's information security configuration and usage policy or baseline policy (e.g., 316). For example, this baseline policy may be used to create graphs.

As inventory assets change over time, policy specification module 262 may continually compare the inventory assets against the baseline policy to determine whether the new inventory assets or the changes to the existing inventory assets continue to adhere to the baseline policy. If the new inventory does not adhere to the baseline policy, policy specification module 262 may adjust the inventory assets until they adhere to the policy, or re-run the policy generation process to generate a new information security configuration and usage policy for the enterprise that encompasses the updated inventory.

The policies generated by policy specification module 262 are cloud-independent. A cloud-independent security policy may include rules relating to the cloud-based assets of an enterprise, where each rule may describe either approved behavior or configuration for all identities such as users, machines, and cloud services. For example, a cloud independent policy may be "Users in Group B cannot access machines only in Cloud C." Another cloud-independent policy may be "Account D OR All Databases should not be accessible from the Internet." The cloud independent policies are also human-readable and organizational friendly such that an organization/enterprise user may easily apply them, for example, users may apply a policy and associated rules to any cloud or customer environment. While the application is convenient for users, the present system enforces these policies by performing complex analyses of the current customer estate and configuring all appropriate cloud controls. Continuing with the above example, policies may be identified and attached to Group B such that the users are restricted from accessing any machines outside Account D in Cloud C.

Because policies are intuitive and organization friendly and cloud independent, users may understand and customize the policies without hard learning curves. In some embodiments, policy customization module 264 allows a user (e.g., a team in an enterprise) to make changes to the policies. Policy customization module 264 may allow policy customization based on a change that may impact the security of one or more cloud-based assets. Therefore, when an actionable insight (e.g., an alert) is generated based on a graph (e.g., an organization graph, user graph, or resource graph), policy customization module 264 may allow the policy to be customized to reflect the change. For example, if an alert shows that a connection between two machines needs to be cut off to prevent unauthorized access, the policy customization module 264 may customize the policy such that this connection will be removed when the policy is applied to the two machines.

In some embodiments, a user may need permission to customize the policies. Policy customization module 264 may create a "Team" to include the user(s) who request the customization of a policy and provide the "Team" the permission(s) to make changes to the policy. The permission(s) may allow the "Team" to add, edit, or delete the existing rules of the policy. In some embodiments, policy customization module 264 may also maintain the timelines of a policy so that any changes to the policy will be tracked, e.g., when it is shared with or used by other entities. The policy customization is further described below with reference to FIG. 6B in the context of a policy hub.

Policy Collaboration

Policy hub module 266 allows users within an enterprise to create, share, and collectively enforce security, compliance, and corporate the generated and/or customized policies. In some embodiments, policy hub module 266 may store the policies in a policy hub (e.g., a database) and organize the stored policies as blueprints. Policy hub module 266 may organize the blueprint as a combination of (1) individual rules and count; (2) categorization of individual rules such as for identity and access management, compute, storage, network, etc.; (3) branch information per team or user that the blueprint is shared with; (4) accessibility and customizations rules for teams and/or users, for example, who can view the policies, who can edit or customize the policies, who can share the policies with other users; (5) real-time view of the cloud environment the policies are applied to; (6) real-time view of the users who are actively using the policies; and (7) current and historical information regarding threats, and pass and fail rates for rules in the blueprint applied to the customer's cloud estate or cloud-based assets.

A policy blueprint is a distinct unit of security policy management that can be tracked, shared with other users/teams, and customized by teams and individual users. Each policy blueprint in the policy hub includes rules that are cloud-independent. Suppose a cloud environment of an enterprise includes one or more clouds. The one or more clouds include a first set of cloud-based assets managed by a first entity (e.g., a group, a team, a business unit) and a second set of cloud-based assets managed by a second entity. When a cloud-independent policy is generated (and/or customized) and applied to the first set of assets and activity involving one or more of the first set of assets, policy hub module 266 may share this policy with the second entity and communicate with other modules to apply the policy to the second set of assets and activity involving one or more of the second set of assets. In other words, one group may share a policy with another group such that the other group may adopt the policy rather than regenerating it.

Figure 6A:
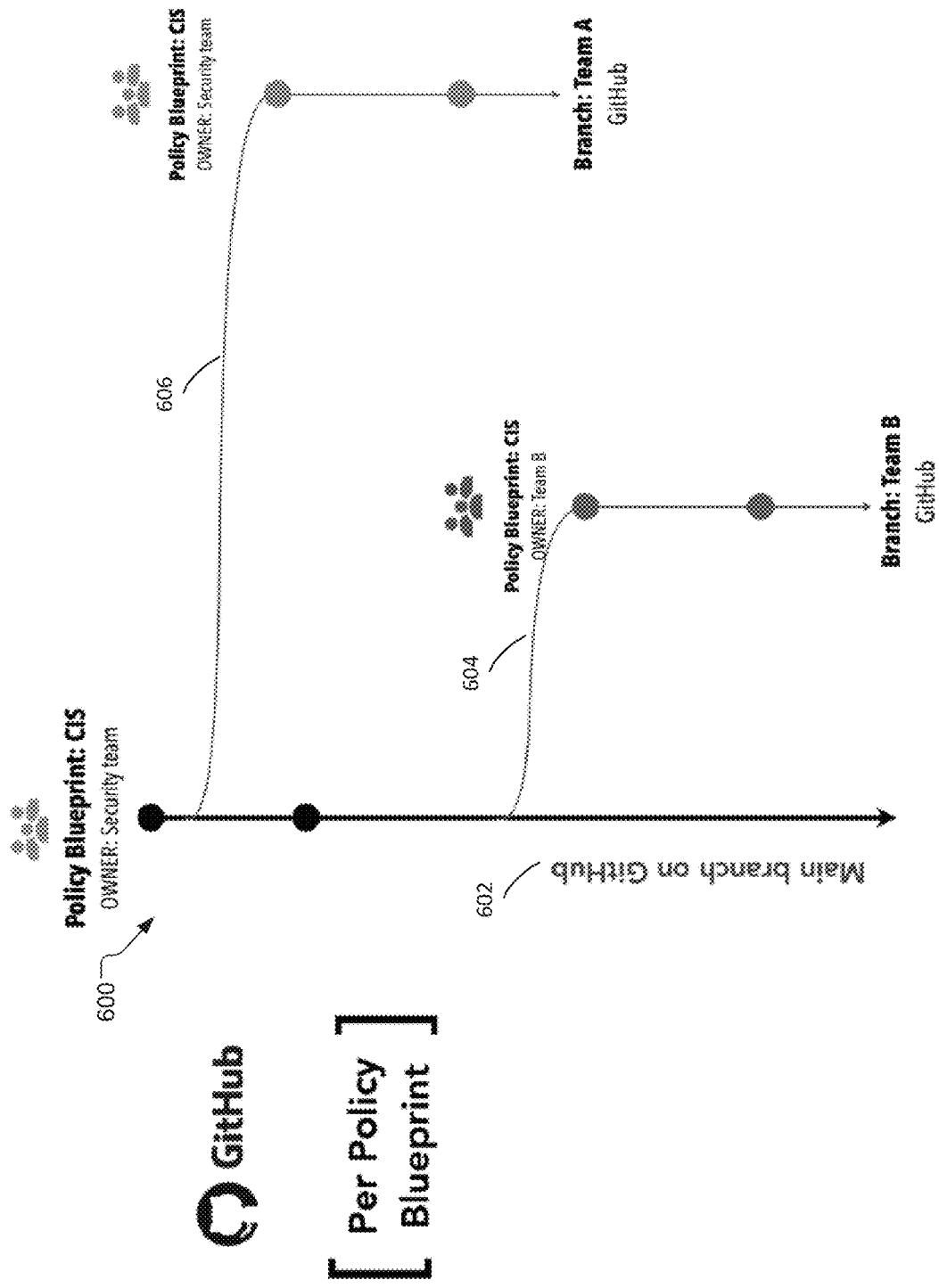
FIG. 6A illustrates a framework for sharing policies in an organization, according to some embodiments.

The collaborative framework provided by policy hub module 266 is very helpful when operations of the enterprise become more and more distributed and separate. Policy collaboration is especially useful when teams are individually and collectively responsible for cloud security in one or more clouds, but often execute in siloes without any shared goals or information. FIG. 6A illustrates a framework for sharing policies in an organization. As depicted, the present system may provide a highly scalable, framework for entities to share policies with others in the enterprise easily and consistently. This unique approach eliminates duplication, disparate and incoherent efforts to codify and enforce policies, and enables a consistent way to implement security with common goals that may be dictated by organizational standards for security and compliance. In addition to being highly scalable for large-scale collaboration, FIG. 6A also shows a complete system of record that is maintained across multiple teams and users for every policy blueprint in the Policy Hub.

Policy hub module 266 allows the policies to be shared across entities, and thus obviates the need for every developer to understand the security policy before implementing it. When a policy, which performs well on the first assets managed by the first entity, is shared and applied to the second assets managed by the second entity, the developer in the second entity does not need to train and learn the cloud security controls related to the policy. In some embodiments, policy hub module 266 provides visibility into the security health of assets on which the policy has been applied. Even if multiple entities may have distinct preferences for security and compliance, the developer of one entity does not need to start creating a policy from scratch, but rather makes small and necessary revisions and/or exceptions to the policy based on the visibility.

Policy hub module 266 also maintains a complete system of record across multiple entities for each policy blueprint in the policy hub. The record includes current and historical threats and enforcement data for the rules of a policy. As shown in FIG. 6A, a convenient and efficient system is provided for a team of an entity to create and implement policies quickly with the ability to share all that information (even retrospectively) with other teams that may need them at some point in the future. Often teams and/or entities maintain poor records of their existing security policies and keep no tracking of historical information, such as which policies have been enforced, what threats existed and/or have been detected, and how policies have evolved, etc. With the present system, any entity (e.g., groups, users) can share a complete status of the security of their cloud-based assets along with complete historical evidence and a timeline for adherence to security, compliance, and corporate standards. Such a record system allows convenient and continuous tracking of the rules/policies without extra efforts, which further facilitates functions or services such as reporting, search, auditing, etc.

For every policy blueprint and owner, the present system may maintain a tree structure in a cloud- or network-based hosting service (e.g., GitHub) to track every share of policy, historical data for compliance and various other security metrics, etc. In some embodiments, the tree structure is used to track the policy share from the owner of the blueprint to every team and/or each user in the team with which the blueprint is shared. In the example tree structure 600 of FIG. 6A, the original version of the policy blueprint is maintained on the main branch 602. The additional branches (e.g., 604, 606) of the tree structure 600 may be automatically created. These branches may be named after each downstream team or user that the owner of the blueprint shares the policy blueprint with. In some embodiments, downstream teams and users may choose (e.g., by a single click) to selectively share security metrics and historical data associated with the blueprint (e.g., the metrics/data maintained in real-time) with upstream owners. In this way, the entire use of GitHub is completely transparent to customers. Every team and users may simply share and customize the policies without concerning about how information is maintained and secured behind the scenes.

The data sharing, monitoring, and tracking using the tree structure as shown in FIG. 6A may completely eliminate manual and error-prone ways of other information sharing, such as using excel spreadsheets, word documents, e-mails. Moreover, entities (e.g., security teams) only need one single click to obtain critical performance information, e.g., historical information on threats, failed policies, etc., for any existing blueprints in use with the present system.

In some embodiments, owners of policy blueprints may share the policy blueprints with downstream teams and users, as well as controlling what further actions can be undertaken by those teams and users. The further actions may include, for example, editing blueprints, sharing blueprints, duplicating blueprints, etc.

Figure 6B:
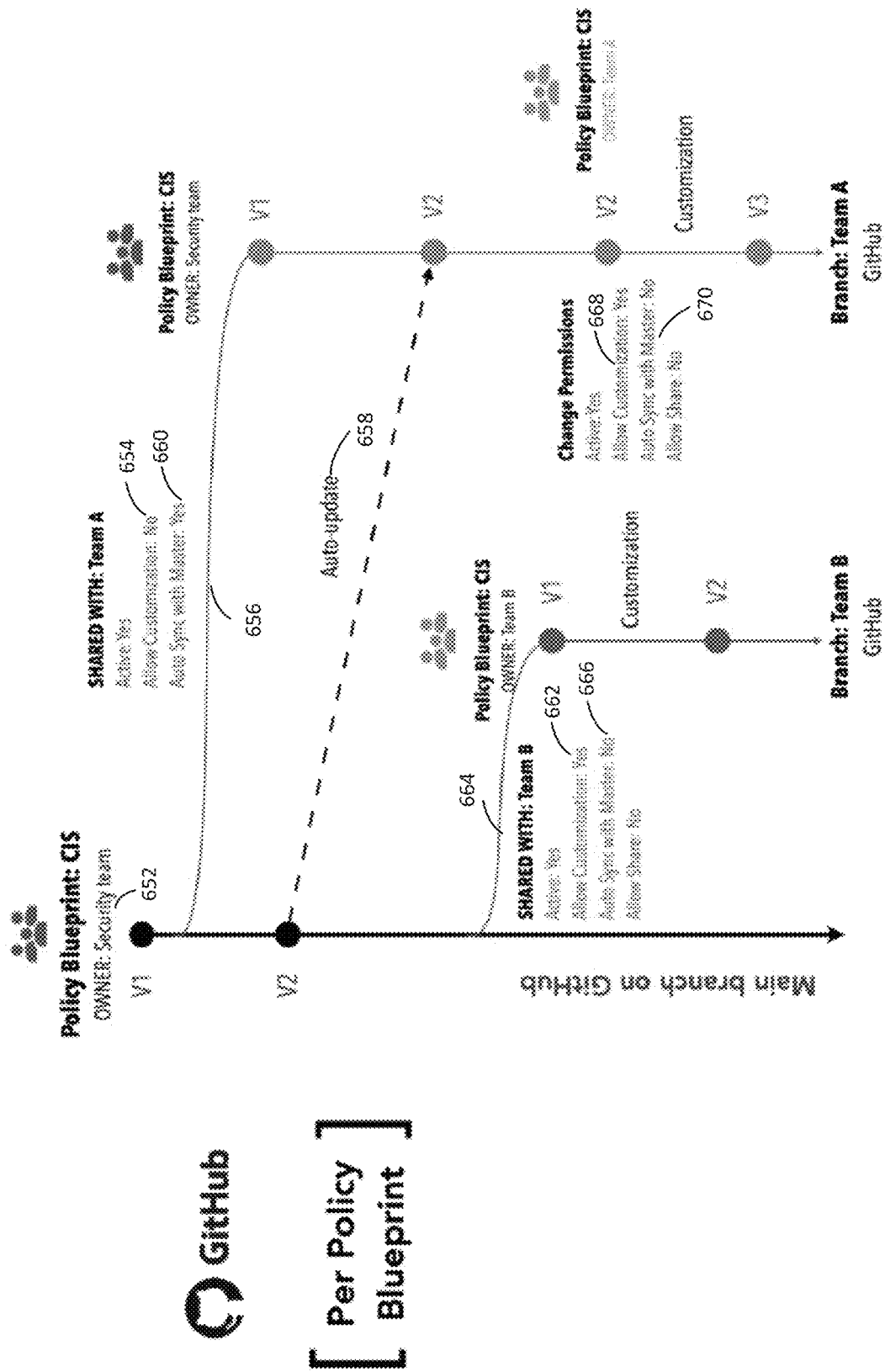
FIG. 6B illustrates a policy sharing example in an organization, according to some embodiments.

Based on the permissions given by the owners to downstream teams or individual users, some actions may be automatically allowed/permitted or disallowed/denied. FIG. 6B illustrates a policy customization example 650 in an organization, according to some embodiments. In this example, policy customization module 264 in combination with policy specification module 262 and policy hub module 266 may work together to allow an owner (e.g., security team 652) to share a policy blueprint for internet security (CIS) benchmarks. Based on the owner's preferences, these modules may initially prohibit Team A from customizing the policy blueprint and later allow the policy customization from Team A. In the meanwhile, these modules may allow the policy blueprint to be shared with Team B and customized by Team B based on the owner's preferences.

According to the above policy setup, Team A cannot add, edit existing rules in the policy blueprint, as shown in 654 of FIG. 6B. A branch named "Team A" 656 is created, on which the versioning (e.g., V1, V2, V3) of the shared blueprint is maintained. In some embodiments, when an owner makes changes to the blueprints, policy customization module 264 in combination with policy specification module 262 and policy hub module 266 may work together to automatically update 658 these changes for Team A, for example, V2 of the blueprint is updated and shown to Team A because "Auto Sync with Master: Yes" in 660. While Team A sees the updated version of the blueprint, the ownership of the blueprint remains with the security team 652.

On the other hand, it is configured that Team B can add, edit or delete existing rules in the policy blueprint, i.e., "Allow Customization: Yes" in 662. A branch named "Team B" 664 is created on which the entire history of the shared blueprint is maintained. In some embodiments, when an owner makes changes, these changes may not be synchronized with the changes managed by Team B, i.e., "Auto Sync with Master: No" in 666. In this circumstance, Team B becomes the owner of the blueprint.

The security team 652, however, can change their preferences to cause the modules to permit/disallow customization for any team/user at any time. For example, the owner's permission is changed so that Team A is allowed to customization, i.e., "Allow Customization: Yes" in 668. At this time, Team B becomes the owner of the policy blueprint on branch "Team A" with automatic updates being turned off, i.e., "Auto Sync with Master: No" in 670. Even so, the entire timeline of blueprint may be maintained from the time it was first shared with Team A and then later if the CIS policy blueprint is customized. In this example, the first version V1 to the current version V3 are all maintained on the branch 656 of Team A.

Policy Virtualization

Policy virtualization module 268 creates virtual representations for cloud inventory using a cloud-independent policy interface by abstracting all the complexity of security controls, inventory items, and associated configurations to achieve security and compliance posture. Policy virtualization module 268 also performs security policy virtualization to hide disparate implementations of cloud vendors for their respective security controls. For example, policy virtualization module 268 may create representations for computer systems/machines in public clouds and datacenter, and each representation eliminates any vendor, manufacturer, provider or publisher specific or proprietary attributes or constructs. Therefore policy virtualization module 268 can provide a framework that makes cloud security portable and consistent for a hybrid or multi cloud operational environment.

An enterprise/organization may be responsible for managing and securing multiple computer systems that are provided by various vendors, providers, and manufacturers. Although the computer systems provided by various sources may be of similar type and/or provide similar functions, these computer systems are often managed, configured, monitored, and maintained differently, using attributes and methods specific to each provider. Policy virtualization module 268 may produce a virtual representation of each of the computer systems such that they can be managed, configured, monitored, and maintained as a generic computer system, independent of any vendor, manufacturer, provider, or publisher specific or proprietary attributes or constructs.

In some embodiments, policy virtualization module 268 may uniformly and consistently represent physical cloud inventory/enterprise assets, as virtual inventory assets, to ensure that associated policies are independent of any specific, proprietary attributes. The policies are associated with the objects that represent organizational requirements for the computer systems. Policy virtualization module 268 in communication with policy customization module 264 may adjust the policies and settings to simulate or model changes to the underlying computer systems. These changes may impact the security of the systems, the security of the group of objects, the domain or network in which the systems reside, or the productivity or usage of the systems.

Policy Enforcement

While the policy definitions are intuitive, organization friendly, and cloud independent, the enforcement of these policies usually requires complex analysis of the current cloud-based assets in the cloud-based environment and configuration of appropriate cloud controls. For example, when cloud independent policies are "Users in Group B cannot access machines only in Cloud C" and "Account D OR All Databases should not be accessible from the Internet," the enforcement of policies may include attaching the policies to Group B so that all users are restricted from accessing any machines outside Account D in Cloud C. Also, policy enforcement may require the cloud independent policies to be translated before the policies can be directly applied to the actual, underlying cloud-based assets (e.g., computer systems) in a provider-specific cloud (e.g., specific cloud).

Referring to FIG. 3, when an actionable insight, e.g., alert remediation 314, is generated, base policy 316 is customized to generate the customized policy 320. The remediation in 314 may take effect after the customized policy 320 is actually applied, e.g., by policy enforcement module 270.

The alert remediation 314 may be generated based on an analysis of one or more cloud-based assets in one or more clouds and a first cloud-based activity associated with the one or more cloud-based assets that occurred within the one or more clouds. Policy enforcement module 270 may apply the customized cloud-independent security policy 320 for taking remediation on the cloud-based assets of the enterprise existing within the one or more clouds. In some embodiments, policy enforcement module 270 may also apply policy 320 to other activities. The other activities may be one or more activities that involve one or more cloud-based assets within the one or more clouds and are related to the first activity. For example, if a cloud-independent security policy is applied for remediation (e.g., closing user account, changing user role) when an unauthorized first user accessed a machine, policy enforcement module 270 may apply the same policy when a different unauthorized user subsequently accesses the same machine.

In some embodiments, policy enforcement module 270 may configure the one or more clouds to enforce the rules of the customized cloud-independent security policy on the cloud-based assets and on the second cloud-based activity involving one or more of the cloud-based assets. In some embodiments, policy enforcement module 270 may invoke at least one cloud-specific API or cloud-specific command in accordance with the rules of the customized policy, and enforce the policy on a cloud of the one or more clouds using the cloud-specific API or commands. For example, when performing policy translation and automatic remediation, policy enforcement module 270 may invoke cloud-specific API or commands on behalf of the user or the enterprise. When performing manual remediation, policy enforcement module 270 may generate and provide the customer the cloud-specific API or commands for the user to perform the remedial action(s).

Typically, prior to applying a policy to the cloud-based asset(s), policy enforcement module 270 may communicate with user interface module 240 or other modules to notify the user of the security problem associated with the asset(s), how the problem may be remediated, and the users and/or assets that the remediation may affect, etc. Once the policy enforcement 270 receives the corresponding feedback and/or approval from the user, policy enforcement module 270 may start to apply the policy to the asset(s).

Application of a policy to a set of cloud-based enterprise assets in a cloud environment may yield one or more items of assets (e.g., computer systems) that are out of compliance with one or more rules in that policy. In such instances, policy enforcement module 270 may make changes to the set of enterprise assets for remediation and bring the one or more items of assets into compliance with the policy. Using the cloud-independent policy applied to the set of enterprise assets, policy enforcement module 270 may make changes (including the modifications, or remediation actions) to the virtual representation of vendor-independent items or computer systems that need to be corrected. In some embodiments, when the cloud environment includes two or more clouds operated by two or more respective cloud operators/providers, and each cloud of the two or more clouds includes a respective portion of the enterprise, policy enforcement 270 may translate the remediation actions to each provider-specific cloud so that the changes can be made to the underlying computer systems.

In some embodiments, policy enforcement module 270 may translate the cloud-independent policy to cloud-specific policy in three steps: action definition, action distribution, and action translation. In some embodiments, to apply the cloud-independent security policy, policy enforcement module 270 may determine, based on at least a graph representing a set of the cloud-based enterprise assets, whether the set of cloud-based assets complies with a rule of the cloud-independent policy. If the set of cloud-based enterprise assets is not in compliance with the rule, policy enforcement module 270 may identify, based on the rule, a cloud-independent remediation action to be performed to bring the set of cloud-based enterprise assets into compliance with the rule. Policy enforcement module 270 may also identify, based on the set of cloud-based enterprise assets, at least one of the two or more clouds to which the cloud-independent remediation action applies, and translate the cloud-independent remediation action into at least one set of cloud-specific commands to be issued to the at least one cloud. Policy enforcement module 270 may then issue the at least one set of cloud-specific commands to the at least one cloud.

1. Action Definition

Action is the modification made to one or more cloud-based enterprise assets that may be required to bring the cloud-based assets in compliance with a policy. In some embodiments, the action can be one or more of the "Add," "Remove," and "Update." That is policy enforcement module 270 may create an entirely new asset, remove an asset, or modify an existing asset. For example, policy enforcement module 270 may perform an "Add" action to create an entirely new virtual computer system, such as a new "Role" with restricted expanded permissions. For this new "Role," policy enforcement module 270 may also add one or more "Users" if these users require more restricted or more permissive access to some computer systems.

2. Action Distribution

In some embodiments, policy enforcement module 270 may use an action distribution process to determine to which cloud and/or cloud-based asset the actions will apply. Policy enforcement module 270 may determine the vendor, manufacturer, provider, or publisher to which the actions apply. Policy enforcement module 270 may also identify each of the cloud-based assets (e.g., computer systems) to which each of the actions will apply. Once a full set of actions for the virtual cloud-based assets has been defined, policy enforcement module 270 may distribute these actions to the identified items of the cloud-based assets to determine what underlying vendor, manufacturer, provider or publisher attributes or constructs need to be invoked to take the appropriate actions. For example, adding an object to virtual assets may require the addition of several actual objects provided by multiple vendors. If a new "Role" is required to allow or restrict permissions, policy enforcement module 270 may determine that the new "Role" may be needed in multiple environments provided by different vendors. If an attribute is to be removed from all computer systems of a given type in the virtual assets, policy enforcement module 270 may determine that the actual systems of that type should be provided by several different vendors.

3. Action Translation

In some embodiments, policy enforcement module 270 may translate the virtual actions into real-world actions, using software commands specific to the attributes or constructs provided by each vendor, manufacturer, provider, or publisher. In some embodiments, the software commands suitable for modifying computer systems may be known in advance for each supported vendor. In some embodiments, the software commands may be scripted commands or API calls.

When the software commands are scripted commands, policy enforcement module 270 may take actions in the form of a set of commands intended to be run using a Command Line Interface (CLI). Given that the vendor provides scriptable CLI actions to add, remove or update their computer systems or assets in the cloud, policy enforcement module 270 may translate the actions into vendor-specific attributes or constructs, and produce the desired "Add," "Remove," or "Update" actions to a specific cloud.

Policy enforcement module 270 may also take action by invoking one or more API calls intended to be run directly on the vendor-provided system. Given that the vendor provides callable API methods to add, remove or update their computer systems or assets in the cloud, policy enforcement module 270 may translate the actions into vendor-specific attributes or constructs, and produce the desired "Add," "Remove," or "Update" actions to a specific cloud.

Figure 7:
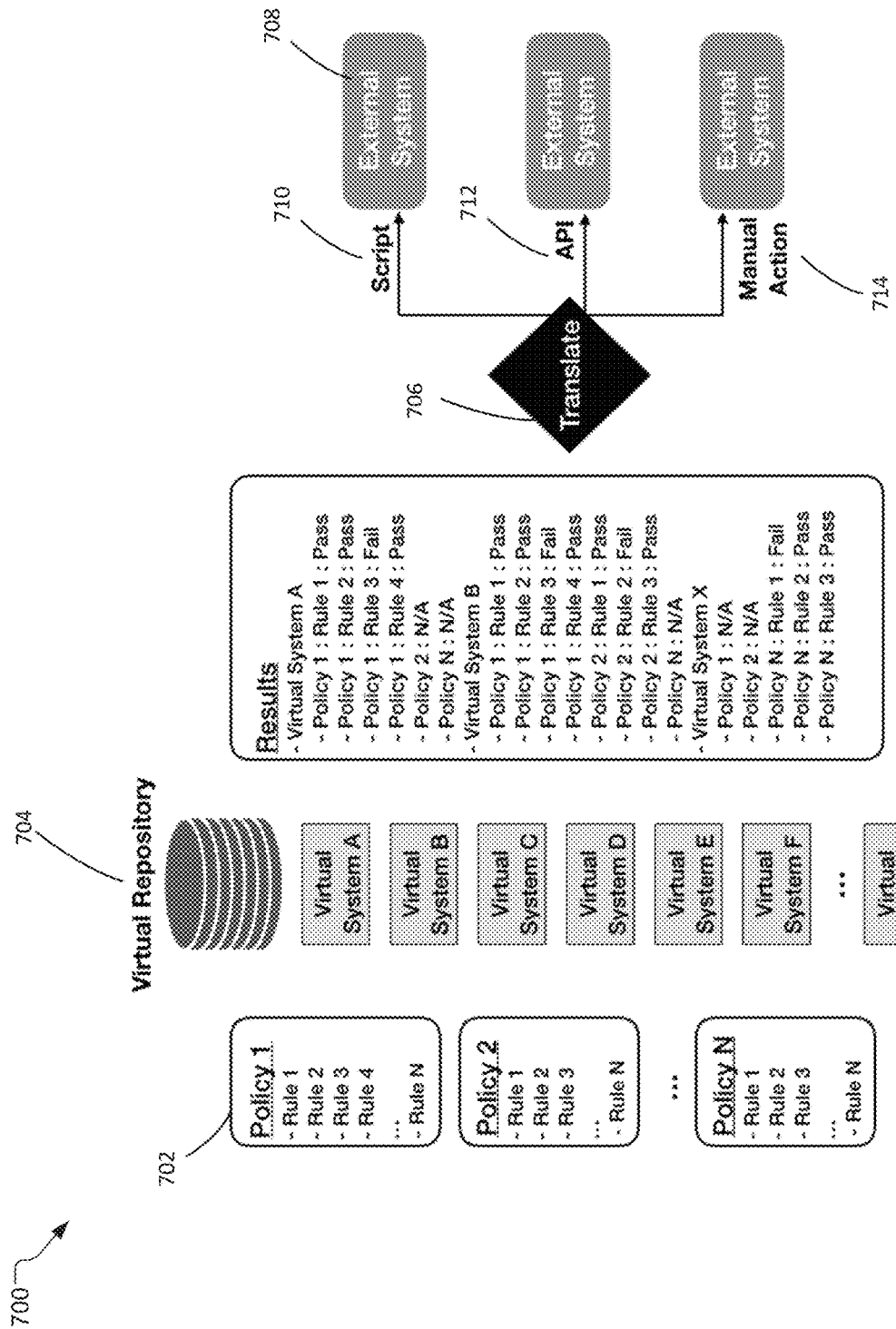
FIG. 7 illustrates a policy translation framework for cloud independent policies, according to some embodiments.

FIG. 7 illustrates a policy translation framework 700 for cloud independent policies. As depicted, cloud independent policies 702 are generated and imposed on the virtual systems 704, for example, the cloud-based assets represented by one or more graphs. To enforce these policies, policy enforcement module 270 may translate 706 these cloud independent policies 702 and apply the translated policies to external systems 708 existing in a vendor-specific cloud. In some embodiments, to translate the cloud independent policies 602, policy enforcement module 270 may invoke at least one cloud-specific script command 710 or cloud-specific API 712 in accordance with the rules of the customized policy, and enforce the policy on the external systems 708 using the cloud-specific script commands 710 or API 712. In other embodiments, policy enforcement module 270 may generate and provide the cloud-specific API or commands to the user so that the user can perform manual action in 714.

In addition to translating and imposing a policy to a specific cloud, policy enforcement module 270 may also continuously and proactively monitor customized enterprise policies and compliance with policies to detect configuration drift, changes to users and resources, etc. In this way, policy breach and escalation may be assessed in real time, and automated and/or manual remediation may be effectively conducted.

In some embodiments, each cloud-based asset has a security score such as a policy effectiveness score (PES). A PES is an indicator of how the existing policy configuration is performing with regard to minimizing security threats and ensuring that there are no alarms against stated organizational and standards-based requirements for security, compliance, and productivity. For example, policy enforcement module 270 may calculate PES based on evaluating the severity of alarms against each entity and aggregating the evaluation.

Moreover, policy enforcement module 270 along with other modules builds a policy management framework that is seamless and transparent, which allows the security virtualization to be extended to cover more cloud-native services and vendor-specific solutions with no change to organizational virtual policies created with the present policy specification language. For example, if one or more cloud-specific services are added to a cloud environment, the organization, user or resource graph(s) created for the existing cloud environment can be extended to include the added one or more cloud-specific services without modifying the cloud-independent security policies generated for the existing cloud environment. In some embodiments, additional third-party integrations to cloud-native services and vendor solutions deliver incremental and more comprehensive orchestration against system policies for a single, hybrid, and/or multi-cloud environment.

Security Management Flowcharts

Figure 8:
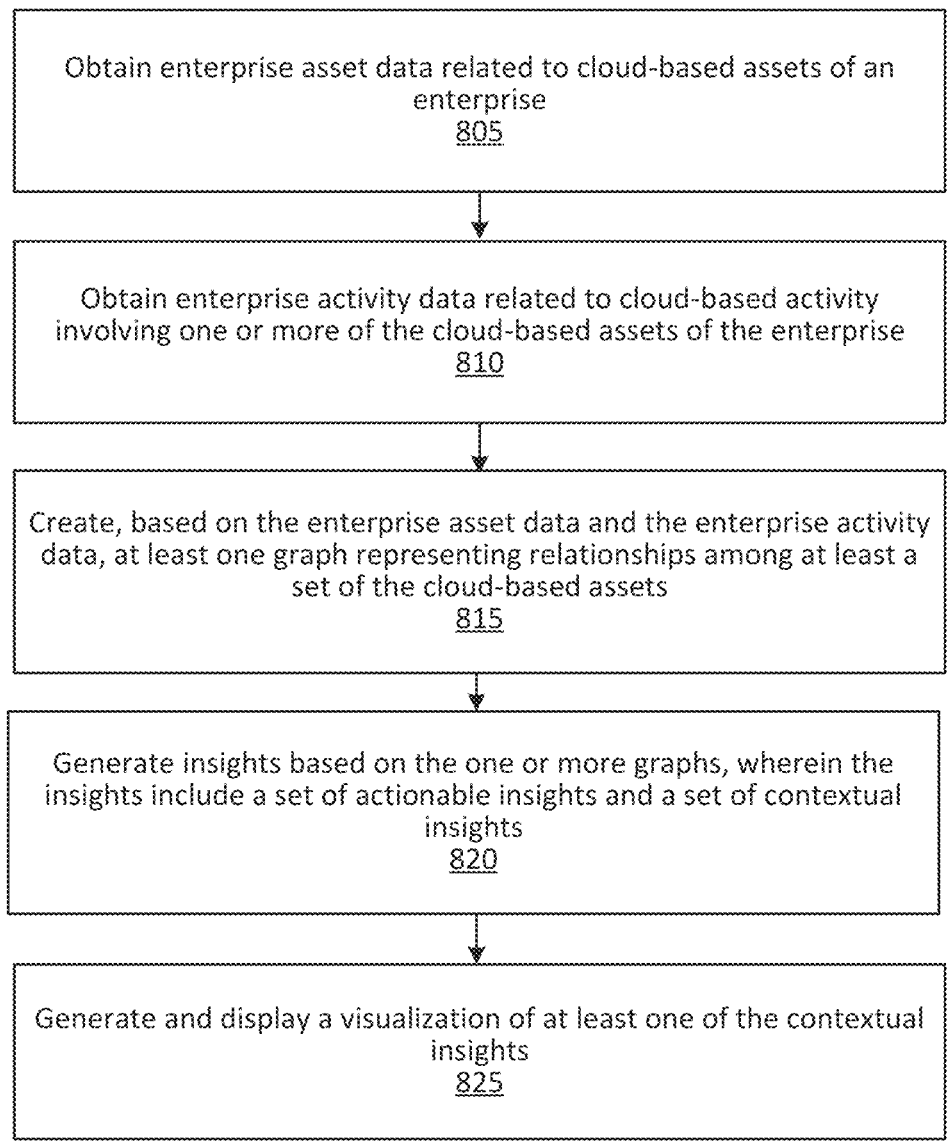
FIG. 8 illustrates an example process for delivering deep contextual visibility and insights in a cloud environment of an enterprise, according to some embodiments.

FIG. 8 illustrates an example process 800 for delivering deep contextual visibility and insights in a cloud environment of an enterprise, according to some embodiments. The cloud environment of the enterprise may include one or more clouds operated by one or more respective cloud operators. In some embodiments, a security application 202 of a management server 200 as depicted in FIG. 2A implements the security management process including process 800. In particular, asset management component 204 of security application 202 as depicted in FIG. 2B in communication with other components of system 100 implements process 800.

At operation 805, asset management component 204 obtains enterprise asset data related to cloud-based assets of the enterprise. In some embodiments, the asset data includes a multitude of identities (e.g., user identities, machine identities, service identities, etc.), other inventory assets (e.g., infrastructure resources, platform service resources, cloud services, security policies, permissions & privileges, configurations, etc.), and entities (e.g., organizations, business units, teams, operating environments, etc.). Asset management component 204 may obtain the enterprise asset data from messages of an on-boarding service or by retrieving the enterprise asset data from an enterprise asset database.

At operation 810, asset management component 204 obtains enterprise activity data related to cloud-based activity involving one or more of the cloud-based assets of the enterprise. For example, data collection module 232 may identify and store the data about logins, access, or actions such as read, list, update, delete, edit, etc. In some embodiments, asset management component 204 may automatically discover the enterprise asset data and the enterprise activity data based on onboarding services, and monitor and update the enterprise asset data and the enterprise activity data in real time. So asset management component 204 may obtain activity data based on real-time monitoring and/or processing logs (e.g., cloud service log).

At operation 815, asset management component 204 creates, based on the enterprise asset data and the enterprise activity data, at least one graph representing relationships among at least a set of the cloud-based assets. In some embodiments, asset management component 204 may identify the relationships among the set of cloud-based assets based on analysis of the enterprise activity data and stores data representing the relationships among the set of cloud-based assets in an enterprise relationship database. In other embodiments, asset management component 204 may also identify the relationships among at least the set of the cloud-based assets based on policies attached to the set of the cloud-based assets. The activity data (e.g., time, frequencies) may indicate to what extent a relationship is active, while a policy may signal the existence of the relationship. Therefore, even in the absence of current activity, asset management component 204 may also determine the relationships among the assets.

In some embodiments, the at least one graph includes an organization graph, a user graph, and/or a resource graph. The organization graph provides an overall view of organizational structure, hierarchy, and relationships among the cloud-based assets of the enterprise, along with the application of policies in each hierarchy. The user graph is a map of user identities with associated activities and/or access permissions to other cloud-based assets. The resource graph is a non-user asset centric view representing relationships, dependencies, access permissions, or activity of non-user assets with user identities of the cloud-based assets.

In some embodiments, asset management component 204 creates the at least one graph by analyzing the enterprise asset data and the enterprise activity data to generate cloud-specific data describing the relationships among the set of the cloud-based assets, converting the cloud-specific data describing the relationships into cloud-independent representations of the set of the cloud-based assets, and creating the at least one graph using the cloud-independent representations.

At operation 820, asset management component 204 generates insights based on the at least one graph. The insights may be actionable insights and/or contextual insights. In some embodiments, when generating the insights, asset management component 204 may discover and prioritize the actionable insights based on the relationships. Each of the actionable insights represents a potential security risk. In some embodiments, asset management component 204 also traverses the at least one graph to identify an attack path associated with the potential security risk represented by an actionable insight. The attack path indicates how a cloud-based asset is exposed to a security risk directly or indirectly.

At operation 825, asset management component 204 generates and displays a visualization of at least one of the contextual insights. For example, the color of an asset representation in a graph may indicate a risky level of the asset, and intuitively guide a user to prioritize the security operations.

Figure 9:
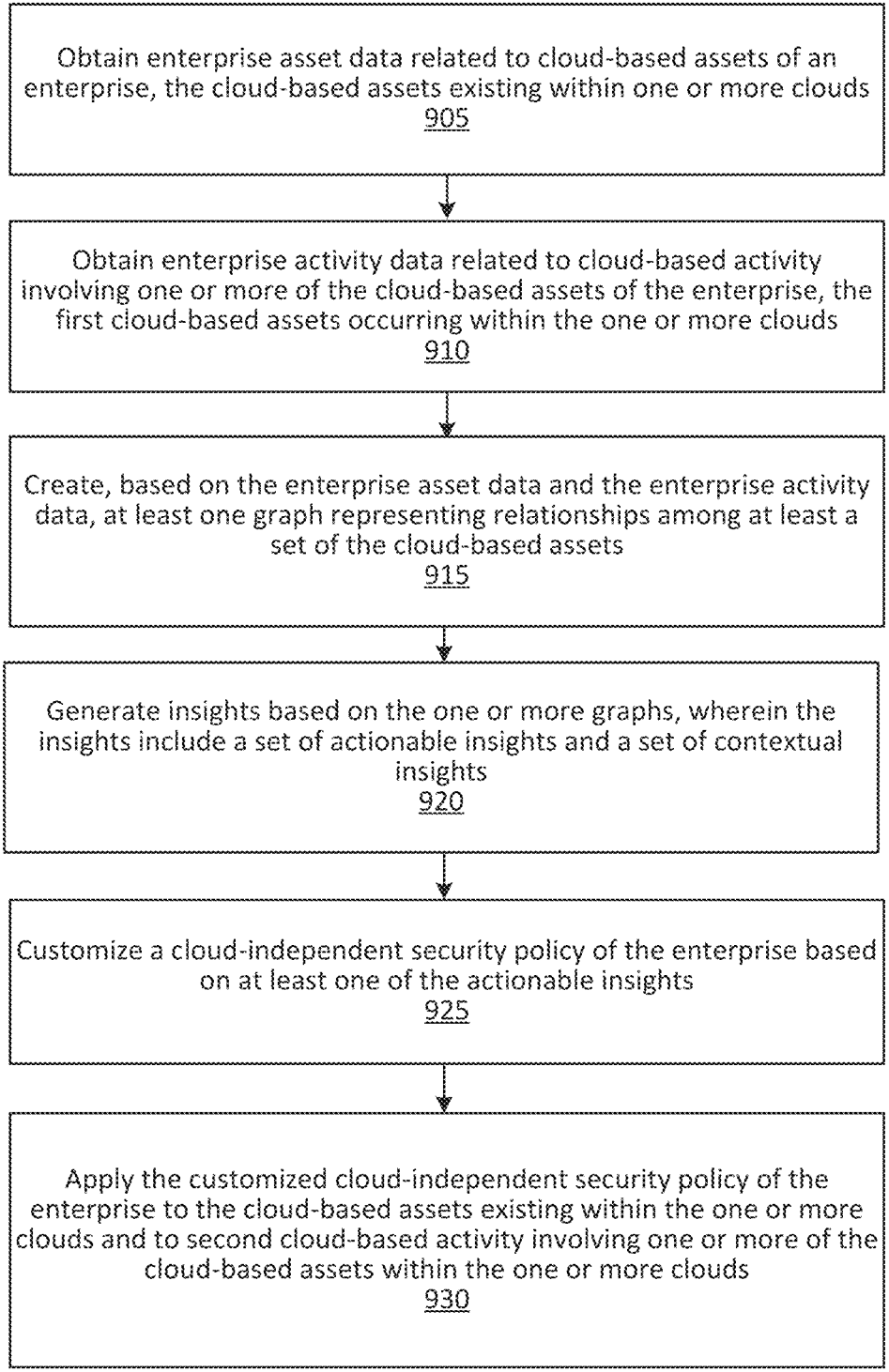
FIG. 9 illustrates an example process for enforcing a cloud-independent security policy, according to some embodiments.

FIG. 9 illustrates an example process 900 for enforcing a cloud-independent security policy, according to some embodiments. In some embodiments, a security application 202, including an asset management component 204 and a policy management component 206 as depicted in FIG. 2A, implements the process 900. At operation 905, asset management component 204 obtains enterprise asset data related to cloud-based assets of an enterprise. The cloud-based assets exist within one or more clouds. At operation 910, asset management component 204 obtains enterprise activity data related to first cloud-based activity involving one or more of the cloud-based assets of the enterprise. The first cloud-based activity occurs within the one or more clouds. At operation 915, asset management component 204 creates, based on the enterprise asset data and the enterprise activity data, at least one graph representing relationships among at least a set of the cloud-based assets. At operation 920, asset management component 204 generates insights based on the at least graph. The insights include a set of actionable insights and a set of contextual insights. Operations 905 through 920 are similar to operations of 805 through 820 in FIG. 8, and thus will not be repeatedly described herein. In FIG. 9, however, the cloud environment of an enterprise is a multi-cloud environment that includes two or more clouds operated by two or more respective cloud operators, and each cloud of the two or more clouds includes a respective portion of the cloud-based assets of the enterprise.

In some embodiments, operations of 925 and 930 of FIG. 9 may be performed by policy management component 206. At operation 925, policy management component 206 customizes a cloud-independent security policy of the enterprise based on at least one of the actionable insights. For example, an action insight may be alert remediation that includes one or more remedial actions, and the policy may be customized to have the one or more remedial actions conducted.

At operation 930, policy management component 206 applies the customized cloud-independent security policy of the enterprise to the cloud-based assets existing within the one or more clouds and to second cloud-based activity involving one or more of the cloud-based assets within the one or more clouds. In some embodiments, to apply the customized cloud-independent security policy, policy management component 206 may determine, based on the at least one graph, whether the cloud-based assets of the enterprise comply with a rule included in the customized cloud-independent security policy. If the cloud-based assets are not in compliance with the rule, policy management component 206 may identify, based on the rule, a cloud-independent remediation action to be performed to bring the cloud-based assets of the enterprise into compliance with the rule. Policy management component 206 may identify, based on the cloud-based assets, at least one of the two or more clouds to which the cloud-independent remediation action applies. Policy management component 206 may translate the cloud-independent remediation action into at least one set of cloud-specific commands to be issued to the at least one cloud, and issue the at least one set of cloud-specific commands to the at least one cloud.

Computer Implementation

Figure 10:
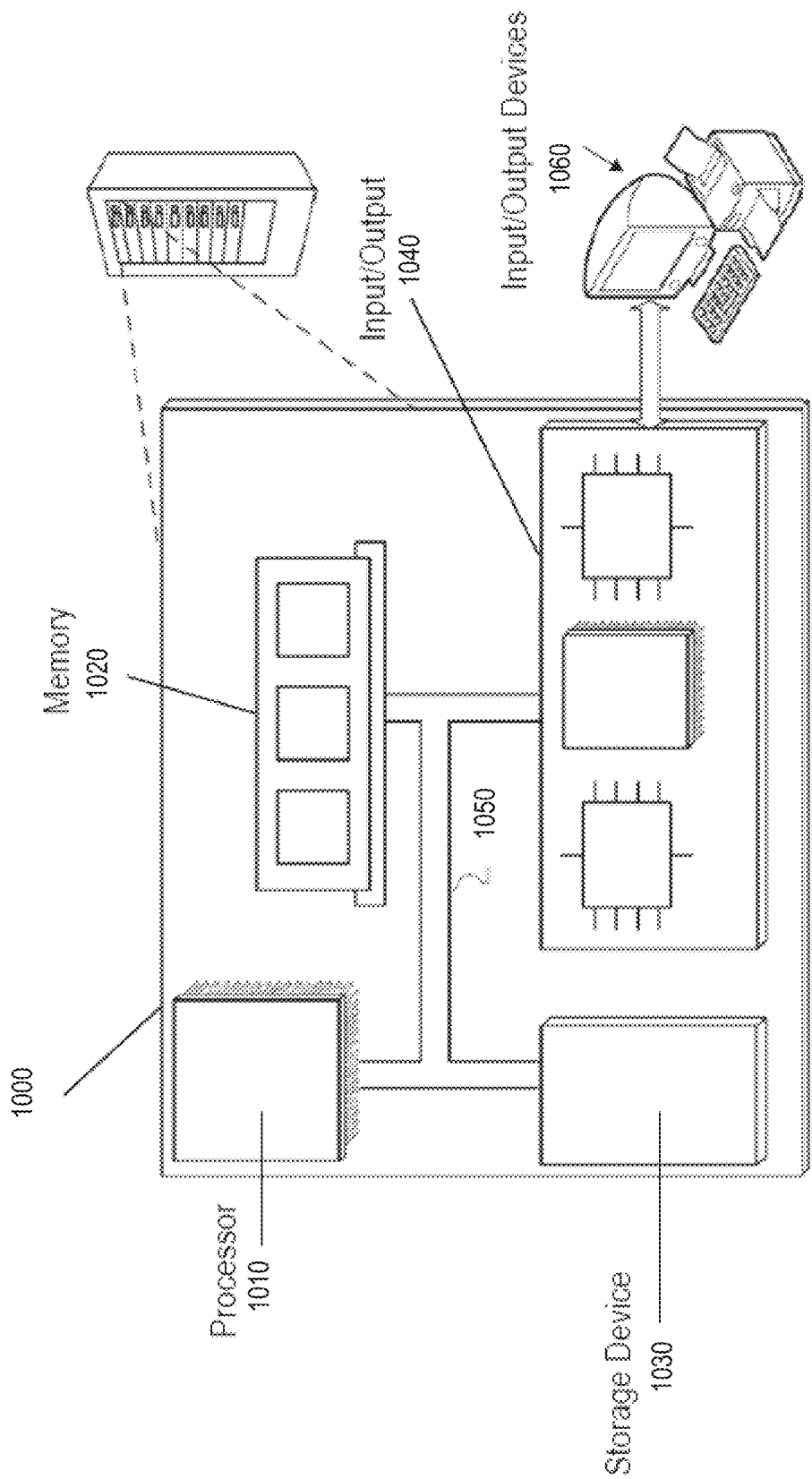
FIG. 10 is a block diagram of an example computer system that may be used in implementing the technology described herein, according to some embodiments.

FIG. 10 is a block diagram of an example computer system 1000 that may be used in implementing the technology described in this document. General-purpose computers, network appliances, mobile devices, or other electronic systems may also include at least portions of the system 1000. The system 1000 includes a processor 1010, a memory 1020, a storage device 1030, and an input/output device 1040. Each of the components 1010, 1020, 1030, and 1040 may be interconnected, for example, using a system bus 1050. The processor 1010 is capable of processing instructions for execution within the system 1000. In some implementations, the processor 1010 is a single-threaded processor. In some implementations, the processor 1010 is a multi-threaded processor. The processor 1010 is capable of processing instructions stored in the memory 1020 or on the storage device 1030.

The memory 1020 stores information within the system 1000. In some implementations, the memory 1020 is a non-transitory computer-readable medium. In some implementations, the memory 1020 is a volatile memory unit. In some implementations, the memory 1020 is a non-volatile memory unit.

The storage device 1030 is capable of providing mass storage for the system 1000. In some implementations, the storage device 1030 is a non-transitory computer-readable medium. In various different implementations, the storage device 1030 may include, for example, a hard disk device, an optical disk device, a solid-date drive, a flash drive, or some other large capacity storage device. For example, the storage device may store long-term data (e.g., database data, file system data, etc.). The input/output device 1040 provides input/output operations for the system 1000. In some implementations, the input/output device 1040 may include one or more of network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1060. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, executable code, or other instructions stored in a non-transitory computer readable medium. The storage device 1030 may be implemented in a distributed way over a network, for example as a server farm or a set of widely distributed servers, or may be implemented in a single computing device.

Although an example processing system has been described in FIG. 10, embodiments of the subject matter, functional operations and processes described in this specification can be implemented in other types of digital electronic circuitry, in tangibly-embodied computer software or firmware, in computer hardware, including the structures disclosed in this specification and their structural equivalents, or combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other units suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices, magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship between client and server arises by virtue of computer programs running on the respective computers and having a client-server relationship with each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Terminology

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.10%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A policy-based security method for managing security policies in a cloud environment of enterprises in a de-centralized manner, the method comprising:
   creating cloud-independent policies associated with enterprise assets in the cloud environment of enterprises;
   sharing the cloud-independent policies across one or more distributed enterprises in the cloud environment of enterprises by:
      identifying and categorizing rules of a policy of the cloud-independent policies;
      identifying teams and users of an enterprise that a policy blueprint of the policy is shared with;
      determining accessibility and customization rules for the identified teams and users; and
      making the identified rules of the blueprint available to the identified teams and users based on the determined accessibility and customization rules;
   translating and enforcing the cloud-independent policies in run-time across the one or more enterprises; and
   applying the cloud-independent policies collaboratively in the distributed enterprises based on distributing policy enforcement in the one or more enterprises while centralizing policy operations.

2. The method of claim 1, further comprising:
   storing the cloud-independent policies in a policy hub; and
   organizing each policy of the stored policies as the policy blueprint.

3. The method of claim 2, further comprising:
   enabling one or more teams or users to customize the policy blueprint based on the customization rules associated with the one or more teams or users,
   wherein the policy is customized independently by each team or user.

4. The method of claim 3, further comprising:
   storing and maintaining a complete record of changes and enforcement to the policy blueprint in the policy hub,
   wherein access to current and historical policies in the complete record is assigned to an owner of the policy blueprint.

5. The method of claim 1, wherein based on applying the cloud-independent policies collaboratively in the distributed enterprises, the method further comprises:
   discovering a plurality of cloud-based assets of the distributed enterprises and enterprise asset data related to the plurality of cloud-based assets, the data including information used to detect, protect, and investigate potential problems of the plurality of cloud-based assets; and
   creating, based on the enterprise asset data, at least one graph representing a plurality of relationships among at least a subset of the plurality of cloud-based assets.

6. The method of claim 5, further comprising:
   generating a plurality of insights based on the at least one graph, wherein the plurality of insights include a set of actionable insights and a set of contextual insights.

7. The method of claim 1, wherein policy enforcement is distributed through delegation, and centralizing the policy operations comprises centralizing monitoring of the policies, reporting of the policies, and compliance checking and resolution of the policies.

8. A policy-based security system for managing security policies in a cloud environment of enterprises in a de-centralized manner, the system comprising:
   a processor; and
   a memory in communication with the processor and comprising instructions which, when executed by the processor, program the processor to perform operations including:
      creating cloud-independent policies associated with enterprise assets in the cloud environment of enterprises;
      sharing the cloud-independent policies across one or more distributed enterprises in the cloud environment of enterprises by:
         identifying and categorizing rules of a policy of the cloud-independent policies;
         identifying teams and users of an enterprise that a policy blueprint of the policy is shared with;
         determining accessibility and customization rules for the identified teams and users; and
         making the identified rules of the blueprint available to the identified teams and users based on the determined accessibility and customization rules;
      translating and enforcing the cloud-independent policies in run-time across the one or more enterprises; and
      applying the cloud-independent policies collaboratively in the distributed enterprises based on distributing policy enforcement in the one or more enterprises while centralizing policy operations.

9. The system of claim 8, wherein the operations further include:
   storing the cloud-independent policies in a policy hub; and organizing each policy of the stored policies as the policy blueprint.

10. The system of claim 9, wherein the operations further include:
   enabling one or more teams or users to customize the policy blueprint based on the customization rules associated with the one or more teams or users,
   wherein the policy is customized independently by each team or user.

11. The system of claim 10, wherein the operations further include:
   storing and maintaining a complete record of changes and enforcement to the policy blueprint in the policy hub,
   wherein access to current and historical policies in the complete record is assigned to an owner of the policy blueprint.

12. The system of claim 8, wherein based on applying the cloud-independent policies collaboratively in the distributed enterprises, the operations further include:
   discovering a plurality of cloud-based assets of the distributed enterprises and enterprise asset data related to the plurality of cloud-based assets, the data including information used to detect, protect, and investigate potential problems of the plurality of cloud-based assets; and
   creating, based on the enterprise asset data, at least one graph representing a plurality of relationships among at least a subset of the plurality of cloud-based assets.

13. The system of claim 12, wherein the operations further include:
   generating a plurality of insights based on the at least one graph, wherein the plurality of insights include a set of actionable insights and a set of contextual insights.

14. The system of claim 12, wherein policy enforcement is distributed through delegation, and centralizing the policy operations comprises centralizing monitoring of the policies, reporting of the policies, and compliance checking and resolution of the policies.

15. A computer program product for providing policy-based security for managing security policies in a cloud environment of enterprises in a de-centralized manner, the computer program product comprising a non-transitory computer readable medium having computer readable program code stored thereon, the computer readable program code being executable by a processor to perform operations including:
   creating cloud-independent policies associated with enterprise assets in the cloud environment of enterprises;
   sharing the cloud-independent policies across one or more distributed enterprises in the cloud environment of enterprises by:
      identifying and categorizing rules of a policy of the cloud-independent policies;
      identifying teams and users of an enterprise that a policy blueprint of the policy is shared with;
      determining accessibility and customization rules for the identified teams and users; and
      making the identified rules of the blueprint available to the identified teams and users based on the determined accessibility and customization rules;
   translating and enforcing the cloud-independent policies in run-time across the one or more enterprises; and
   applying the cloud-independent policies collaboratively in the distributed enterprises based on distributing policy enforcement in the one or more enterprises while centralizing policy operations.

16. The computer program product of claim 15, wherein the operations further include:
   storing the cloud-independent policies in a policy hub; and
   organizing each policy of the stored policies as the policy blueprint.

17. The computer program product of claim 15, wherein the operations further include:
   storing and maintaining a complete record of changes and enforcement to the policy blueprint in the policy hub,
   wherein access to current and historical policies in the complete record is assigned to an owner of the policy blueprint.

* * * * *